US011977420B2

(12) United States Patent
Ou

(10) Patent No.: US 11,977,420 B2
(45) Date of Patent: May 7, 2024

(54) SLIDABLE HINGE MECHANISM AND FOLDABLE DEVICE HAVING SAME

(71) Applicant: GOOGLE LLC, Mountain View, CA (US)

(72) Inventor: Davis Ou, New Taipei (TW)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 17/446,658

(22) PCT Filed: Jul. 8, 2020

(86) PCT No.: PCT/US2020/070247
§ 371 (c)(1),
(2) Date: Sep. 1, 2021

(87) PCT Pub. No.: WO2021/011949
PCT Pub. Date: Jan. 21, 2021

(65) Prior Publication Data
US 2022/0164007 A1    May 26, 2022

Related U.S. Application Data

(60) Provisional application No. 62/875,268, filed on Jul. 17, 2019.

(51) Int. Cl.
*G06F 1/16* (2006.01)
*F16C 11/04* (2006.01)
*H04M 1/02* (2006.01)

(52) U.S. Cl.
CPC ............ *G06F 1/1681* (2013.01); *F16C 11/04* (2013.01); *G06F 1/1616* (2013.01);
(Continued)

(58) Field of Classification Search
CPC ...... G06F 1/166; G06F 1/1622; G06F 1/1652; G06F 1/1681; G06F 1/1624;
(Continued)

(56) References Cited

U.S. PATENT DOCUMENTS

| 6,223,393 | B1 * | 5/2001 | Knopf | G06F 1/1681 |
| | | | | 16/386 |
| 9,348,362 | B2 * | 5/2016 | Ko | G06F 1/1601 |

(Continued)

FOREIGN PATENT DOCUMENTS

| FR | 3002726 A1 * | 9/2014 | ............ A44C 5/107 |
| FR | 3002726 A1 | 9/2014 | |

OTHER PUBLICATIONS

International Search Report and Written Opinion for PCT Application No. PCT/US2020/070247, dated Oct. 6, 2020, 11 pages.

(Continued)

*Primary Examiner* — Nidhi Thaker
(74) *Attorney, Agent, or Firm* — Shumaker & Sieffert, P.A.

(57) ABSTRACT

A foldable device may include a foldable layer and a hinge subassembly including a hinge mechanism and a sliding mechanism. The hinge mechanism may include a plurality of hinge segments, arranged in a plurality of rows, and with adjacent hinge segments movably coupled by a plurality of joint assemblies, based on a folded configuration and an unfolded configuration of the foldable device. The sliding mechanism may be coupled to the hinge mechanism, to provide for further adjustment of relative positions of the plurality of hinge segments based on the folded and unfolded configuration of the foldable device.

30 Claims, 21 Drawing Sheets

(52) U.S. Cl.
CPC .......... G06F 1/1624 (2013.01); G06F 1/1652 (2013.01); H04M 1/0268 (2013.01); H04M 1/022 (2013.01)

(58) Field of Classification Search
CPC ....... G06F 1/1616; F16M 11/12; F16C 11/06; F16C 11/04; H04M 1/022; H04M 1/0268
See application file for complete search history.

(56) References Cited

U.S. PATENT DOCUMENTS

| | | | | |
|---|---|---|---|---|
| 9,606,583 | B2* | 3/2017 | Ahn | ........................ G06F 1/1681 |
| 9,625,947 | B2* | 4/2017 | Lee | ........................ G06F 1/1616 |
| 9,915,981 | B2* | 3/2018 | Hsu | ........................ G06F 1/1652 |
| 10,678,305 | B1* | 6/2020 | Lee | ........................ H04M 1/022 |
| 11,061,436 | B2* | 7/2021 | O'Neil | ................ H04M 1/0216 |
| 2015/0378391 | A1 | 12/2015 | Huitema et al. | |
| 2016/0116944 | A1 | 4/2016 | Lee et al. | |
| 2016/0147267 | A1* | 5/2016 | Campbell | ................. E05D 7/12 16/369 |
| 2016/0202736 | A1* | 7/2016 | Huang | ................. G06F 1/1681 16/369 |
| 2017/0254470 | A1 | 9/2017 | Li et al. | |
| 2018/0024593 | A1* | 1/2018 | Seo | ....................... G06F 1/1681 361/679.21 |

OTHER PUBLICATIONS

International Preliminary Report on Patentability from International Application No. PCT/US2020/070247 dated Jan. 18, 2022, 8 pp.
Notice of Intent to Grant and Text Intended to Grant from counterpart European Application No. 20750149.5 dated Feb. 6, 2023, 8 pp.

* cited by examiner

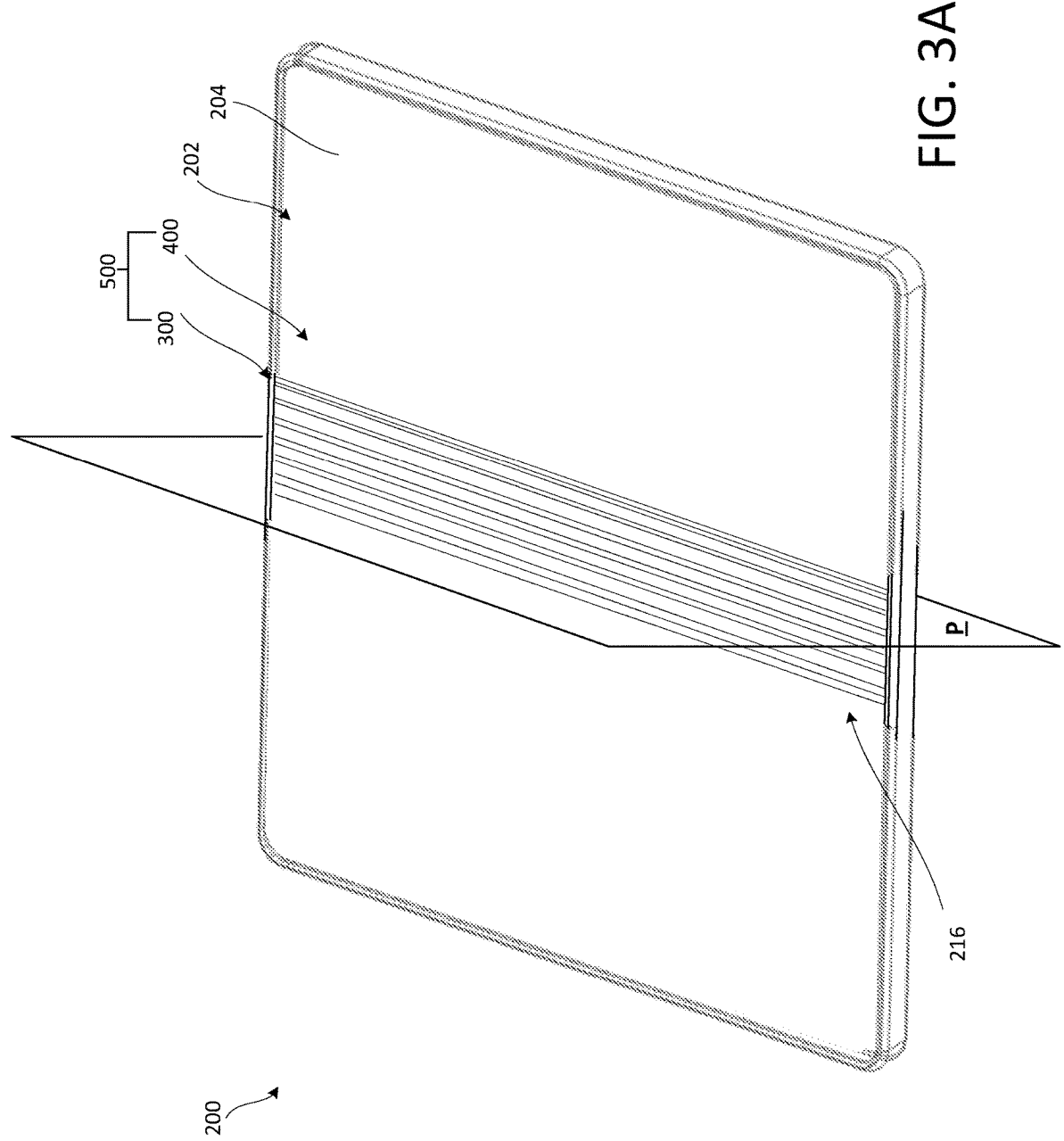

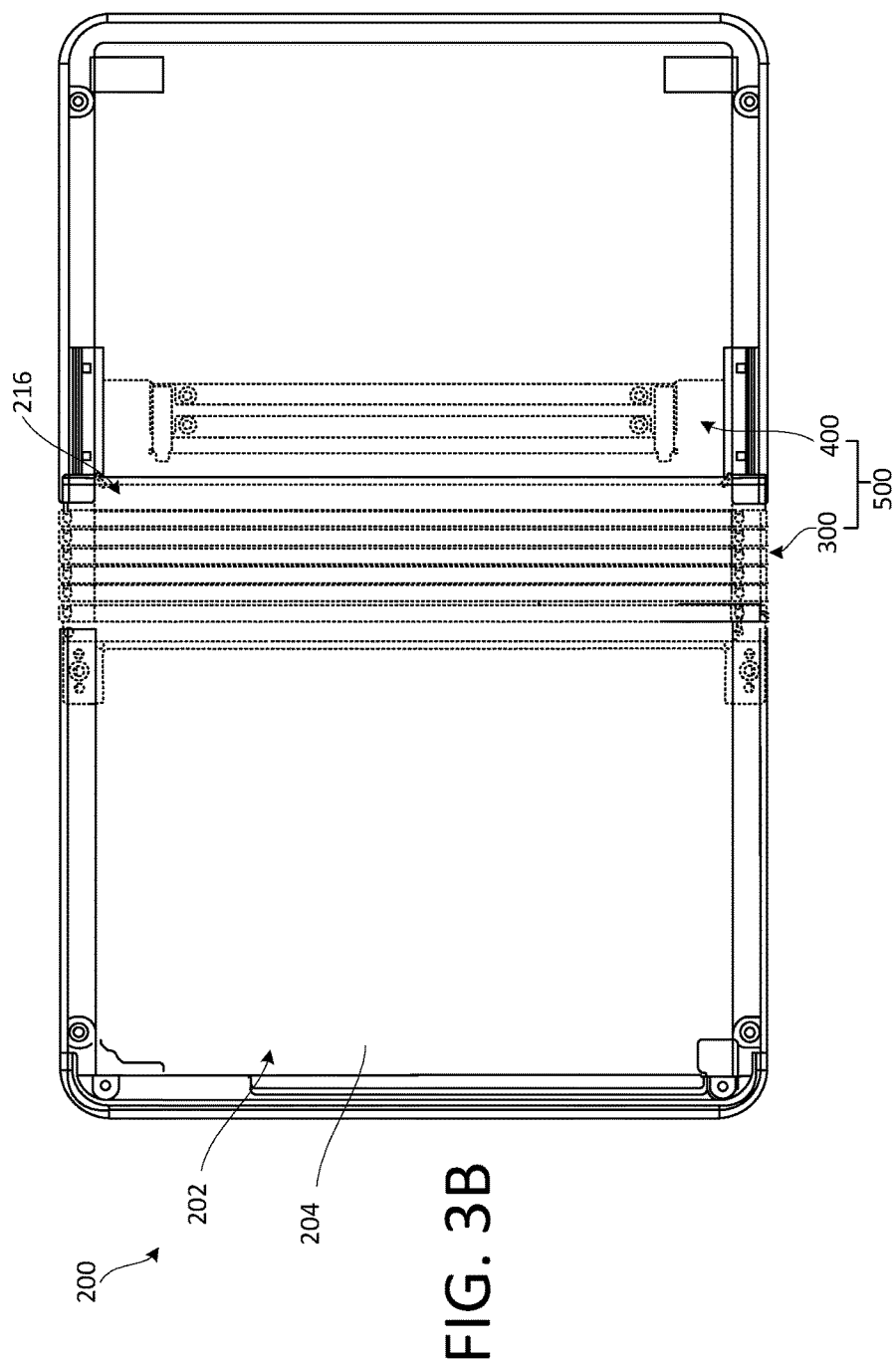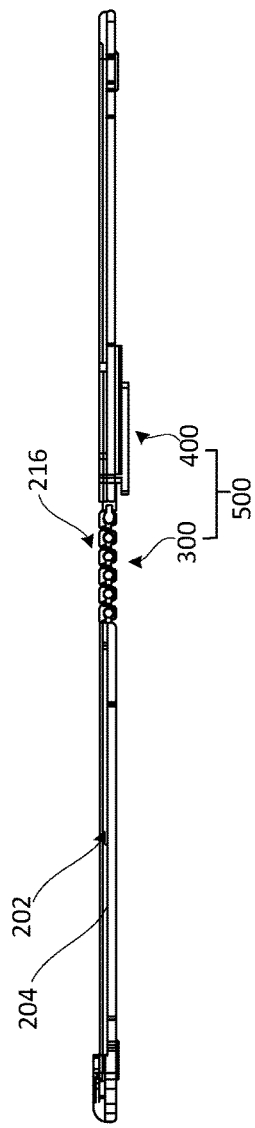

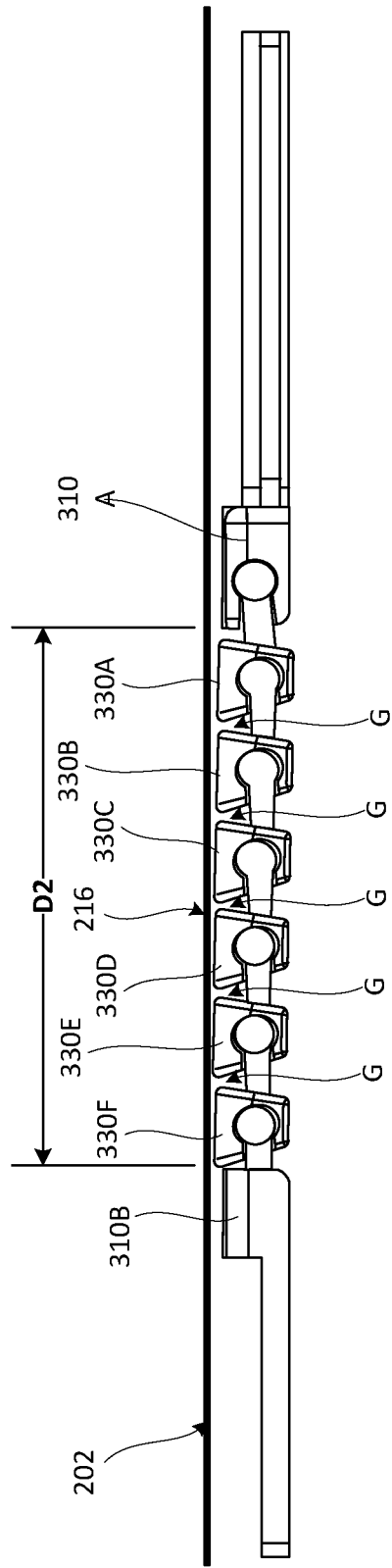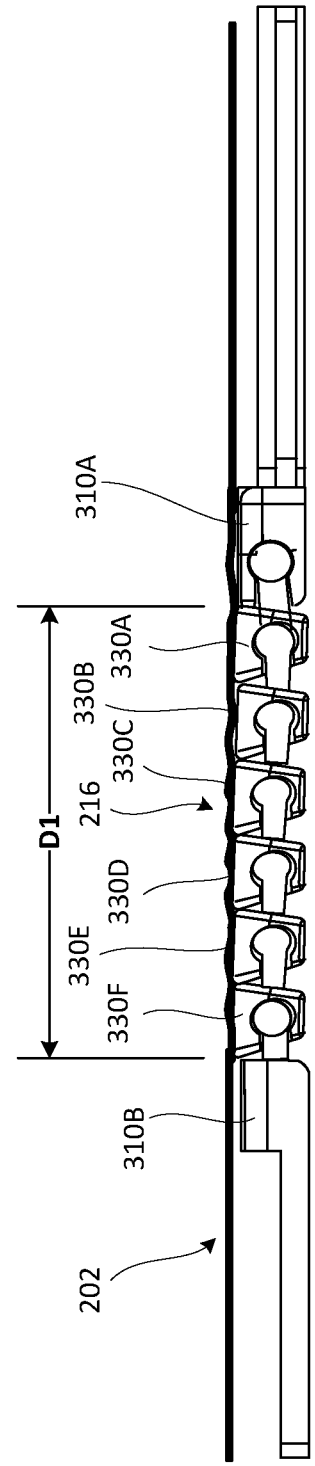

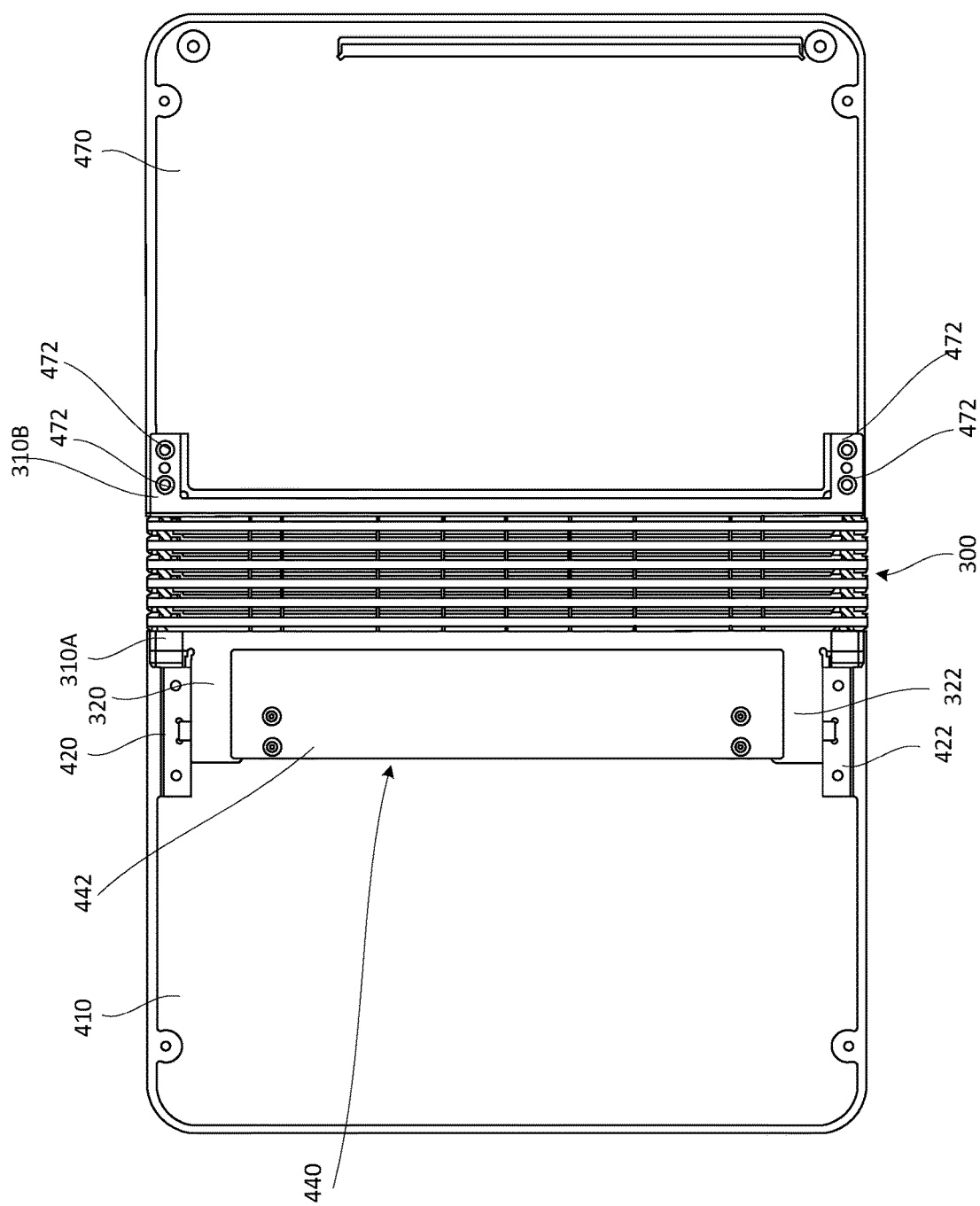

SLIDABLE HINGE MECHANISM AND FOLDABLE DEVICE HAVING SAME

CROSS REFERENCE TO RELATED APPLICATION

This application is a 35 U.S.C. § 371 National Phase Entry Application from PCT/US2020/070247, filed Jul. 8, 2020, designating the U.S., and claims the benefit of U.S. Provisional Application No. 62/875,268, filed Jul. 17, 2019, the disclosures of which are incorporated herein by reference in their entireties.

TECHNICAL FIELD

This description relates, in general, to hinge mechanisms for foldable devices, and, in particular, to slidable hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms may produce a somewhat artificial folding motion, and may introduce stress on the foldable device, thus damaging components of the display portion of the foldable device. Flexible support in a bending area of the display portion of the foldable device may provide a more natural folding motion, may maintain a desired contour, or curvature, of the display portion in the folded configuration, and a desired flatness in the unfolded configuration, and may prevent damage due to excessive compression and/or tension exerted on components of the display portion.

SUMMARY

In a general aspect, a hinge mechanism may include a plurality of hinge segments, arranged in a row, each hinge segment including a socket formed in the hinge segment, and a joint assembly including a plurality of ball joints, each ball joint of the plurality of ball joints being configured to movably couple a pair of adjacent hinge segments of the plurality of hinge segments, such that the pair of adjacent hinge segments are movable relative to each other. In some implementations, each ball joint of the plurality of ball joints may include a rod, a first ball at a first end portion of the rod, and a second ball at a second end portion of the rod. In some implementations, a diameter of the first ball may be greater than a diameter of the rod, and a diameter of the second ball may be greater than the diameter of the rod. In some implementations, the first ball may be movably received in a socket formed in a first hinge segment of the pair of adjacent hinge segments, and the second ball may be movably received in a socket of the second hinge segment of the pair of adjacent hinge segments, so as to movably couple the pair of adjacent hinge segments.

In some implementations, the socket formed in each of the plurality of hinge segments may include a channel defined within the hinge segment, a slot defined in a side portion of the hinge segment, at a position corresponding to the channel, and an opening at an end portion of the of the socket, connected to the channel within the hinge segment. In some implementations, an interior dimension of the channel may be greater than the diameter of the ball received therein such that the ball received therein is movable along a length of the channel. In some implementations, a dimension of the slot may be less than the interior dimension of the first channel, and less than the diameter of the ball received therein, so as to laterally retain the ball received in the channel formed in the socket of the hinge segment. In some implementations, a dimension of the opening may be greater than the diameter of the ball, such that the ball is introduced into the channel of the socket through the opening. In some implementations, a dimension of the slot at a position corresponding to the opening may be less than the diameter of the ball, such that the ball is laterally retained in the channel defining the socket. In some implementations, the ball may be slidable within the channel of the socket in which it is received, and the ball may be movable in three dimensions in the socket in which it is received In another general aspect, a hinge mechanism may include a plurality of elongated hinge segments, arranged in a row. Each hinge segment of the plurality of hinge segments includes: a first socket formed in a first side of the hinge segment; and a second socket formed in a second side of the hinge segment. The hinge mechanism further includes a joint assembly having a plurality of ball joints, each ball joint of the plurality of ball joints being configured to movably couple a pair of adjacent hinge segments of the plurality of hinge segments such that the pair of adjacent hinge segments are movable relative to each other, and such that the plurality of hinge segments are movable relative to each other. Each ball joint of the plurality of ball joints includes: a rod; a first ball at a first end portion of the rod; and a second ball at a second end portion of the rod, where the first ball is movably received in the first socket formed in a first hinge segment of the pair of adjacent hinge segments, and the second ball is movably received in the second socket of the second hinge segment of the pair of adjacent hinge segments, so as to movably couple the pair of adjacent hinge segments.

Implementations can include one or more of the following features, in isolation, or in any combination with each other. For example, the first socket of each hinge segment of the plurality of hinge segments can include a first channel formed within the hinge segment, a first slot formed in the first side of the hinge segment, at a position corresponding to the first channel, and a first opening at a first end portion of the first socket, connected to the first channel. The first channel, first slot and first opening may be arranged such that the first ball and a portion of the rod can be inserted through the first opening and into the first channel so that the first ball is retained in the first channel and another portion of the rod extends out of the first socket through the first slot. The second socket of each hinge segment of the plurality of hinge segments can include: a second channel formed within the hinge segment, a second slot formed in the second side of the hinge segment, at a position corresponding to the second channel, a second opening at a first end portion of the second socket, connected to the second channel. The second channel, second slot and second opening may be arranged such that the second ball and a portion of the rod can be inserted through the second opening and into the second channel so that the second ball is retained in the second channel and another portion of the rod extends out of the second socket through the second slot.

A diameter of the first ball can be greater than a diameter of the rod, and a diameter of the second ball can be greater than a diameter of the rod, and an interior dimension of the first channel can be greater than the diameter of the first ball received therein, such that the first ball is movable along a length of the first socket. The first socket may have a length. This length may or may not be along the longest side or longest part of the first socket. The length of the first socket may extend in a direction that is parallel to a longitudinal axis of the elongate hinge segment in which the first socket is formed. A dimension of the first slot can be less than the interior dimension of the first channel, and less than the diameter of the first ball, so as to laterally retain the first ball received in the first channel formed in the first socket of the hinge segment. The lateral direction may refer to the direction along the row of hinge segments. Laterally retaining the first ball in the first channel may mean that the first ball can move along the first channel parallel to the length of the first socket, but cannot move perpendicular to the length of the first socket through the first slot to disengage the first ball from the first channel. An interior dimension of the second channel can be greater than the diameter of the second ball received therein such that the second ball is movable along a length of the second socket. The second socket may have a length. This length may or may not be along the longest side or longest part of the second socket. The length of the second socket may extend in a direction that is parallel to a longitudinal axis of the elongate hinge segment in which the second socket is formed. A dimension of the second slot can be less than the interior dimension of the second channel, and less than the diameter of the second ball, so as to laterally retain the second ball received in the second channel formed in the second socket of the hinge segment. The lateral direction may refer to the direction along the row of hinge segments. Laterally retaining the second ball in the second channel may mean that the second ball can move along the second channel parallel to the length of the second socket, but cannot move perpendicular to the length of the second socket through the second slot to disengage the second ball from the second channel. A dimension of the first opening can be greater than the diameter of the first ball, such that the first ball is introduced into the first channel of the first socket through the first opening, and a dimension of the first slot at a position corresponding to the first opening can be less than the diameter of the first ball, such that the first ball is laterally retained in the first channel defining the first socket, and a dimension of the second opening can be greater than the diameter of the second ball, such that the second ball is introduced into the second channel of the second socket through the second opening, and a dimension of the second slot at a position corresponding to the second opening can be less than the diameter of the second ball, such that the second ball is laterally retained in the second channel defining the second socket. The first ball can be slidable within the first channel of the first socket, and the first ball can be movable in three dimensions in the first socket. For example, the first ball can be movable in an x-direction, in a y-direction, and in a z-direction within the first socket. The second ball can be slidable within the second channel of the second socket, and the second ball can be movable in three dimensions in the second socket. For example, the second ball can be movable in an x-direction, in a y-direction, and in a z-direction within the second socket.

In a folded configuration of the hinge mechanism, the plurality of hinge segments can be stationary, and can be arranged such that each hinge segment abuts an adjacent hinge segment so as to define a contour corresponding to a bending radius of a foldable display coupled thereto. The plurality of hinge segments may have cooperating shapes for defining a bending radius of a foldable display coupled thereto. For example, the row of hinge segments may define a first outer surface for supporting a foldable display, and a second inner surface opposite the first outer surface. Each of the hinge segments may have a cross-sectional shape in which a first side of the cross section is for cooperating with the first outer surface and has a first width, and a second side of the cross section is for cooperating with the second outer surface and has a second width. The other sides of the cross section joining the first side of the cross section and the second side of the cross section may be tapered. The first width may be larger than the second width so that the other sides of the cross-section taper outwards from the second width to the first width. In the unfolded configuration, the other sides and second side of the cross section may not abut, and in the folded configuration the other sides and second side of the cross section may abut. This may provide added stability in the folded configuration or allow the hinge segments to be effectively stationary in this position. In the folded configuration of the hinge mechanism, the first ball can be positioned at the first end portion of the first socket of the first hinge segment of the pair of adjacent hinge segments, and the second ball can be positioned at the first end portion of the second socket of the second hinge segment of the pair of adjacent hinge segments.

In an unfolded configuration of the hinge mechanism, the plurality of hinge segments can be movable relative to each other, and can be spaced apart from each other such that a plurality of gaps are respectively formed between the plurality of hinge segments. The gaps may define a distance between adjacent hinge segments such that in the unfolded configuration, the total distance defined by the gaps and the row of hinge segments corresponds to a dimension of at least the foldable part of a foldable display when the foldable display is unfolded. This may prevent any warping of the foldable display when supported in its unfolded configuration by the row of hinge segments. In the unfolded configuration of the hinge mechanism, the first ball can be positioned at a second end portion of the first socket of the first hinge segment of the pair of adjacent hinge segments, and the second ball can be positioned at a second end portion of the second socket of the second hinge segment of the pair of adjacent hinge segments.

The hinge mechanism can further include a first bracket coupled to a hinge segment of the plurality of hinge segments positioned at a first end of the arrangement of the plurality of hinge segments and a second bracket coupled to a hinge segments of the plurality of hinge segments positioned at a second end of the arrangement of the plurality of hinge segments. The hinge mechanism may further include a first bracket coupled to a first hinge segment at a first end of the row of hinge segments and a second bracket coupled to a second hinge segment at a second end of the row of hinge segments. The first bracket may have a socket for receiving a ball of a ball joint that has another ball received by a socket of the first hinge segment, and the second bracket may have a socket for receiving a ball of a ball joint that has another ball received by a socket of the second hinge segment. The hinge mechanism can further include a sliding mechanism coupled to the first bracket, where the sliding mechanism includes: a sliding member slidably coupled to the first bracket; a biasing module fixedly coupled to the sliding member such that the biasing module moves together with the sliding member, the biasing module including: a cover fixed to the sliding member; at least one cavity defined between the cover, the sliding member and the first bracket; and at least one elastic member positioned in the cavity, where the at least one elastic member exerts a biasing force that urges the sliding member away from the first bracket. The hinge mechanism can further include a support member fixedly coupled to the second bracket. The sliding mechanism may be movable relative to the hinge mechanism, and the support member may move together with the hinge mechanism.

The hinge mechanism may be for a housing of a computing device for supporting a bendable section of a foldable display of the computing device. The hinge mechanism may be configured to be installed in a housing of a computing device, at a position corresponding to a bendable section of a foldable display of the computing device. The hinge mechanism may further comprise a framing member surrounding an outer periphery of the foldable display and opposite end portions of the hinge mechanism installed in the computing device, wherein the frame member may be bendable so as to maintain an alignment of the hinge mechanism, the foldable display and the housing in a folded configuration and in an unfolded configuration of the computing device.

Another general aspect may provide a housing of a computing device, the computing device comprising a foldable display having a bendable section, and a hinge mechanism at the position of the bendable section. The hinge mechanism may comprise any or all of the features as provided above in the general aspect or below in any of the implementations.

BRIEF DESCRIPTION OF THE DRAWINGS

FIG. 3A is a perspective view, FIG. 3B is a plan view, and FIG. 3C is a side view, of an exemplary computing device in an unfolded configuration, in accordance with implementations described herein.

FIGS. 5A-5I illustrate operation of an exemplary hinge mechanism of the exemplary computing device shown in FIGS. 2A through 3C, in accordance with implementations described herein.

FIGS. 7A-7D illustrate coupling of the exemplary hinge mechanism shown in FIGS. 5A through 6B with an exemplary sliding mechanism, in accordance with implementations described herein.

DETAILED DESCRIPTION

A computing device including a hinge mechanism, in accordance with implementations, as described herein, may provide a relatively simple, and a relatively reliable, mechanism to support and guide the folding and the unfolding of a foldable display of the computing device, using a relatively natural folding and unfolding motion. In some implementations, the hinge mechanism may maintain the foldable display within allowable bending radius limits in the folded configuration of the computing device, and/or may maintain a desired degree of planarity of the foldable display in the unfolded configuration of the computing device. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, while still providing support to the foldable display, and while still maintaining the foldable display within allowable bending radius limits.

A foldable device may include a foldable layer and a hinge subassembly including a hinge mechanism and a sliding mechanism. The hinge mechanism may include a plurality of hinge segments, arranged in a plurality of rows, and with adjacent hinge segments movably coupled by a plurality of joint assemblies, based on a folded configuration and an unfolded configuration of the foldable device. The sliding mechanism may be coupled to the hinge mechanism, to provide for further adjustment of relative positions of the plurality of hinge segments based on the folded and unfolded configuration of the foldable device.

Figure 1B:
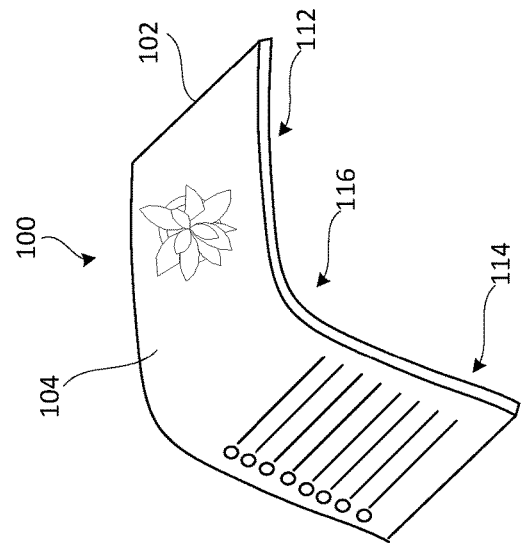
FIGS. 1A-1D illustrate an exemplary computing device including an exemplary foldable display.
Figure 1D:
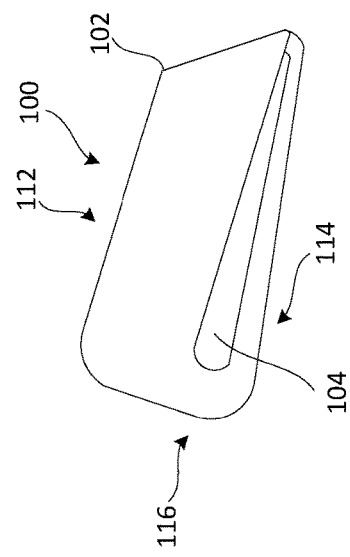
Figure 1A:
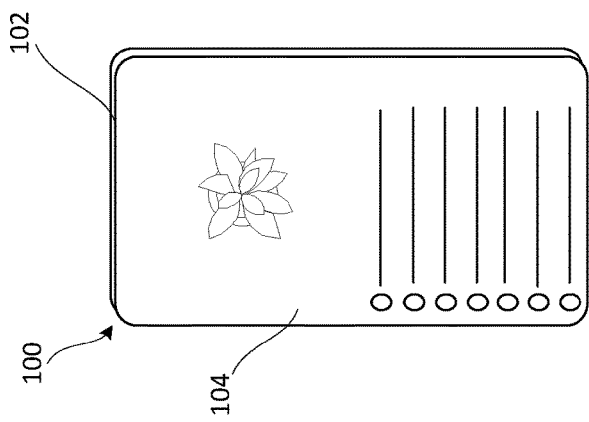
Figure 1C:
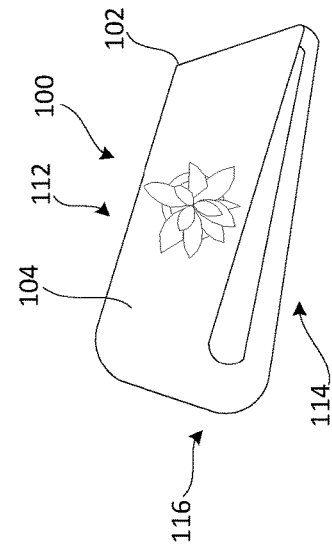

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. In the exemplary computing device 100 shown in FIGS. 1A-1C, the foldable layer 102 is a foldable display 102 that is mounted so that a display surface 104 faces outward in the folded configuration. In some implementations, the foldable display 102 may be mounted on the computing device 100 so that the display surface 104 faces inward when the device 100 is in the folded configuration, as shown in FIG. 1D. The foldable display 102 can include a flexible organic light emitting diode (OLED) layer. In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1C includes a bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, a hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, the hinge mechanism may prevent the foldable display 102 from bending beyond a minimum bending radius (e.g., less than 10 millimeters, less than 5 millimeters, or less than 2 millimeters) and/or from bending beyond a maximum bending radius, or radius of curvature.

Figure 2A:
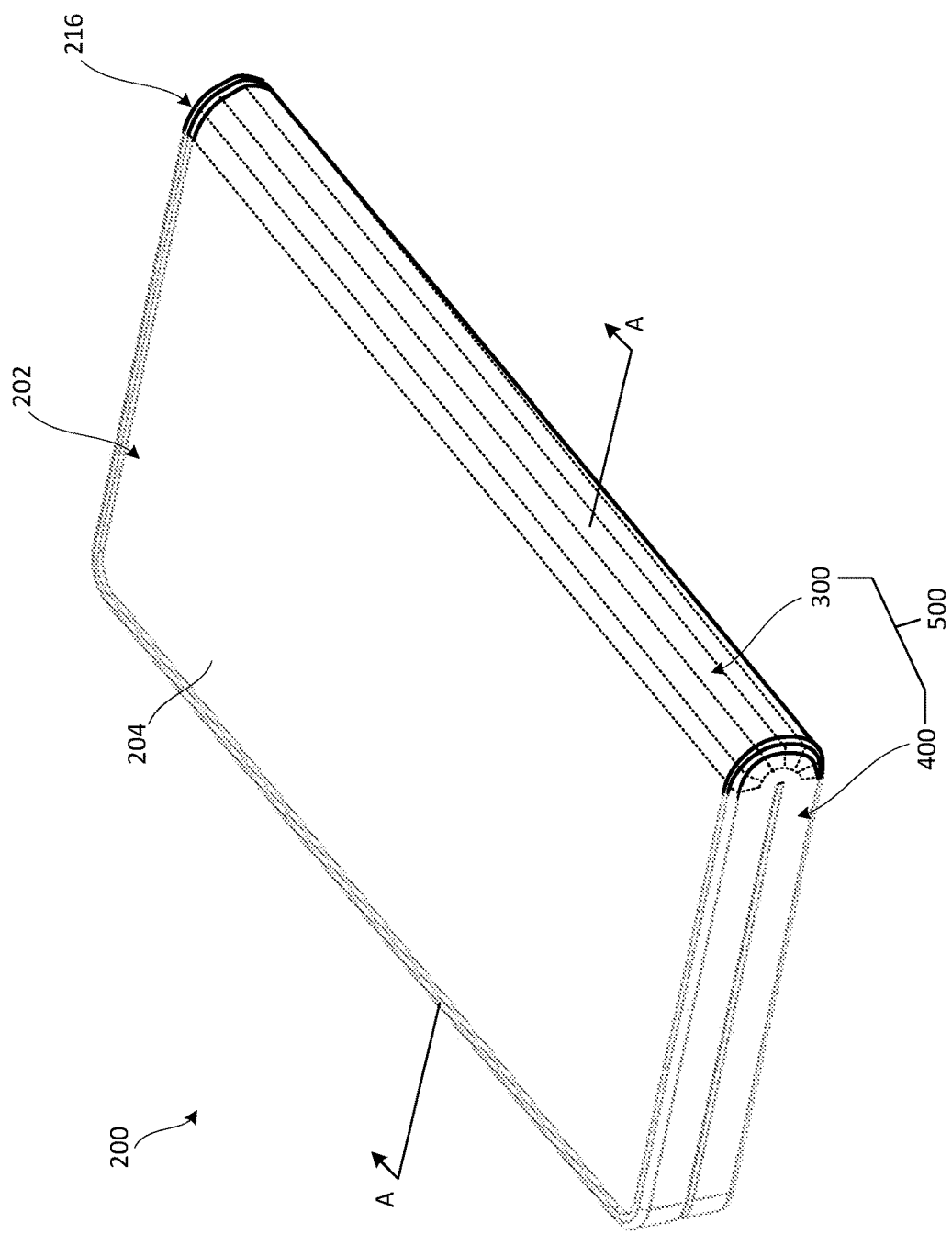
FIG. 2A is a perspective view.
Figure 2B:
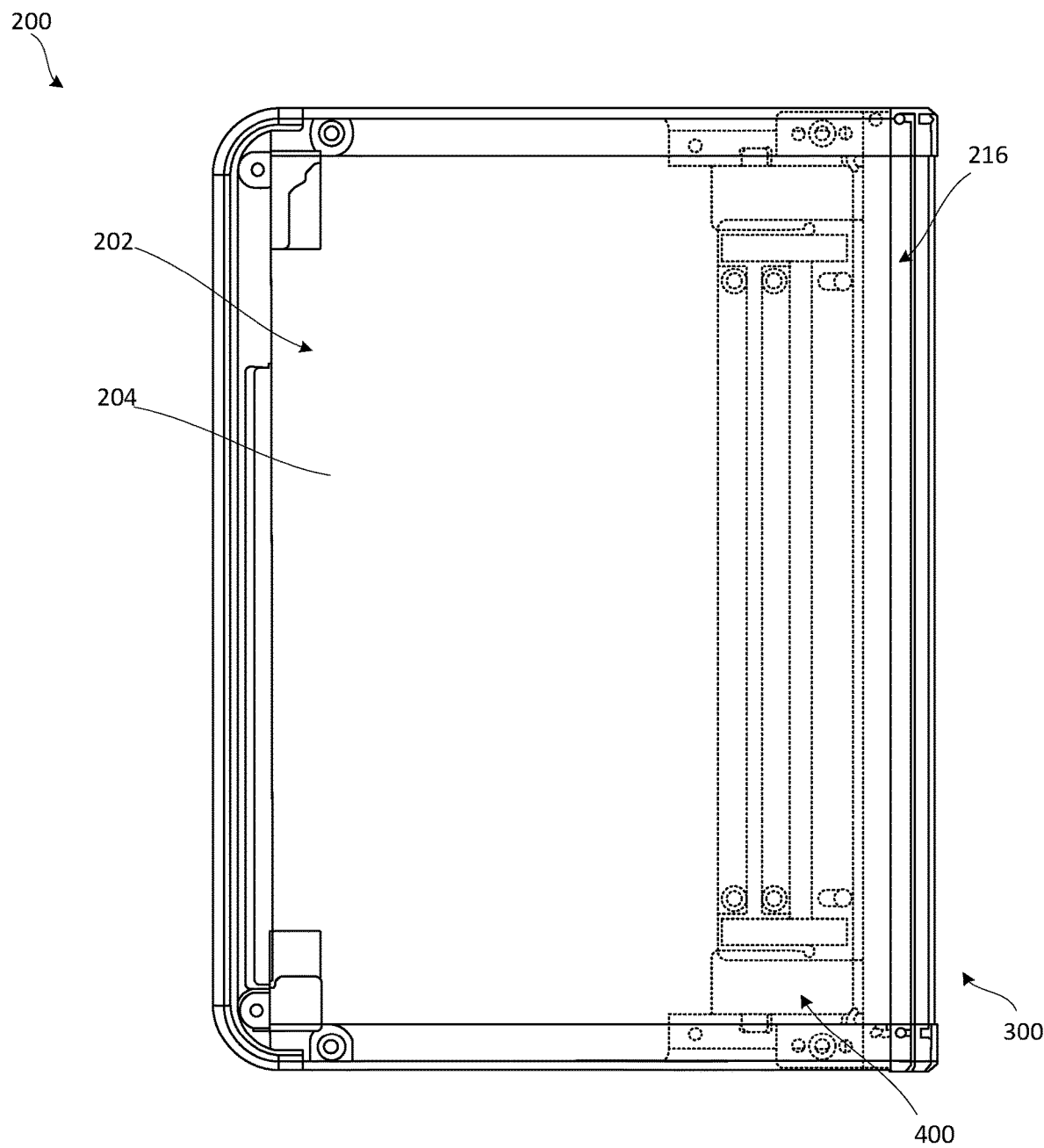
FIG. 2B is a plan view.
Figure 2C:
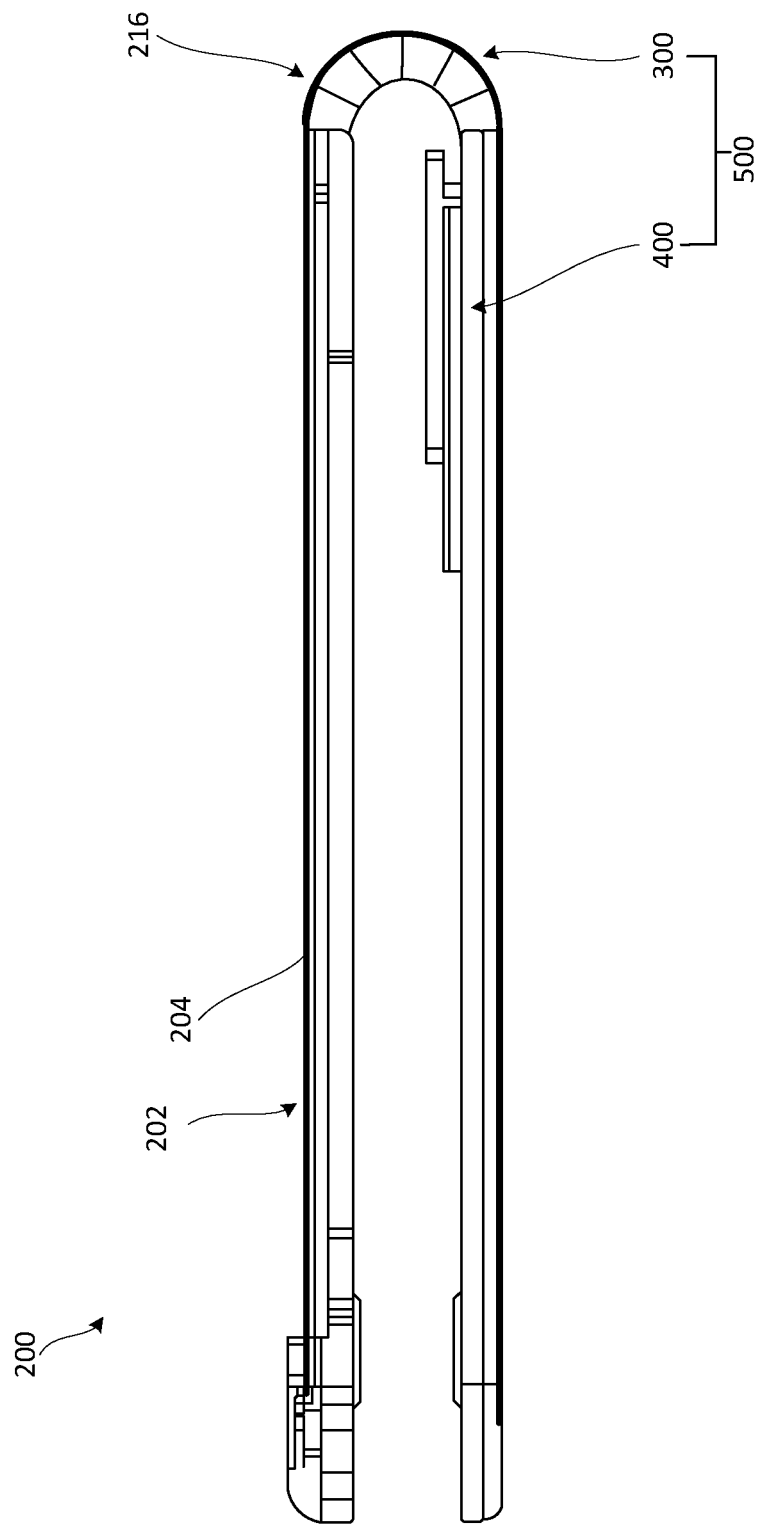
FIG. 2C is a side view, of an exemplary computing device in a folded configuration, in accordance with implementations described herein.

FIG. 2A is a perspective view, FIG. 2B is a top view, and FIG. 2C is a side view, of an exemplary computing device 200 including a foldable layer 202, such as, for example, a foldable display 202, in the folded configuration, supported by an exemplary hinge subassembly 500 including an exemplary hinge mechanism 300, in accordance with implementations described herein. In some implementations, the hinge subassembly 500 may include a sliding mechanism 400 coupled to the hinge mechanism 300. FIG. 3A is a perspective view, FIG. 3B is a top view, and FIG. 3C is a side view, of the exemplary computing device 200 shown in FIG. 2A, in the unfolded configuration.

In the example shown in FIGS. 2A through 3C, the foldable display 202 is mounted on the computing device 200 so that a display surface 204 of the foldable display faces outward when the device 200 is in the folded configuration. However, in some implementations, the foldable display 202 may be mounted so that the display surface 204 faces inward when the device 200 is in the folded configuration (not shown).

In the example shown in FIGS. 2A through 3C, the foldable display 202 includes a foldable portion 216, or a bendable section 216, at a central portion of the computing device 200, simply for purposes of discussion and illustration. In some implementations, the bendable section 216 may be located at positions other than the central portion of the computing device 200, and/or the foldable display 202 can include more bendable sections. In some implementations, the foldable display 202 can be substantially continuously bendable. In the exemplary foldable display 202 shown in FIGS. 2A through 3C, the bendable section 216 allows the foldable display 202 to bend about an axis.

The hinge mechanism 300, in accordance with implementations described herein, may be located in the computing device 200, at a position corresponding to the bendable section 216 of the foldable display 202. The hinge subassembly 500 including the hinge mechanism 300 and, in some implementations, the sliding mechanism 400 may support and guide the folding and the unfolding of the foldable display 202. That is, hinge subassembly 500 including the hinge mechanism 300 may provide for a relatively natural folding and unfolding motion between the folded configuration shown in FIGS. 2A-2C and the unfolded configuration shown in FIGS. 3A-3C. In some implementations, the hinge mechanism 300 may limit, or restrict, an amount of bending or folding in the folded configuration, to prevent the foldable display 202 from bending beyond a minimum bending radius of the foldable display 202, which may result in damage to fragile components of the foldable display 202. In some implementations, the hinge subassembly 500 may include the sliding mechanism 400 coupled to the hinge mechanism 300, to adjust a position of components of the hinge mechanism 300 relative to the foldable display 202. The sliding mechanism 400 may adjust the position of the hinge mechanism 300 to provide for planarity of the foldable display 202, particularly in the bendable section 216, in the unfolded configuration, and to maintain an arrangement of components of the hinge mechanism 300 in the folded configuration.

Figure 4:
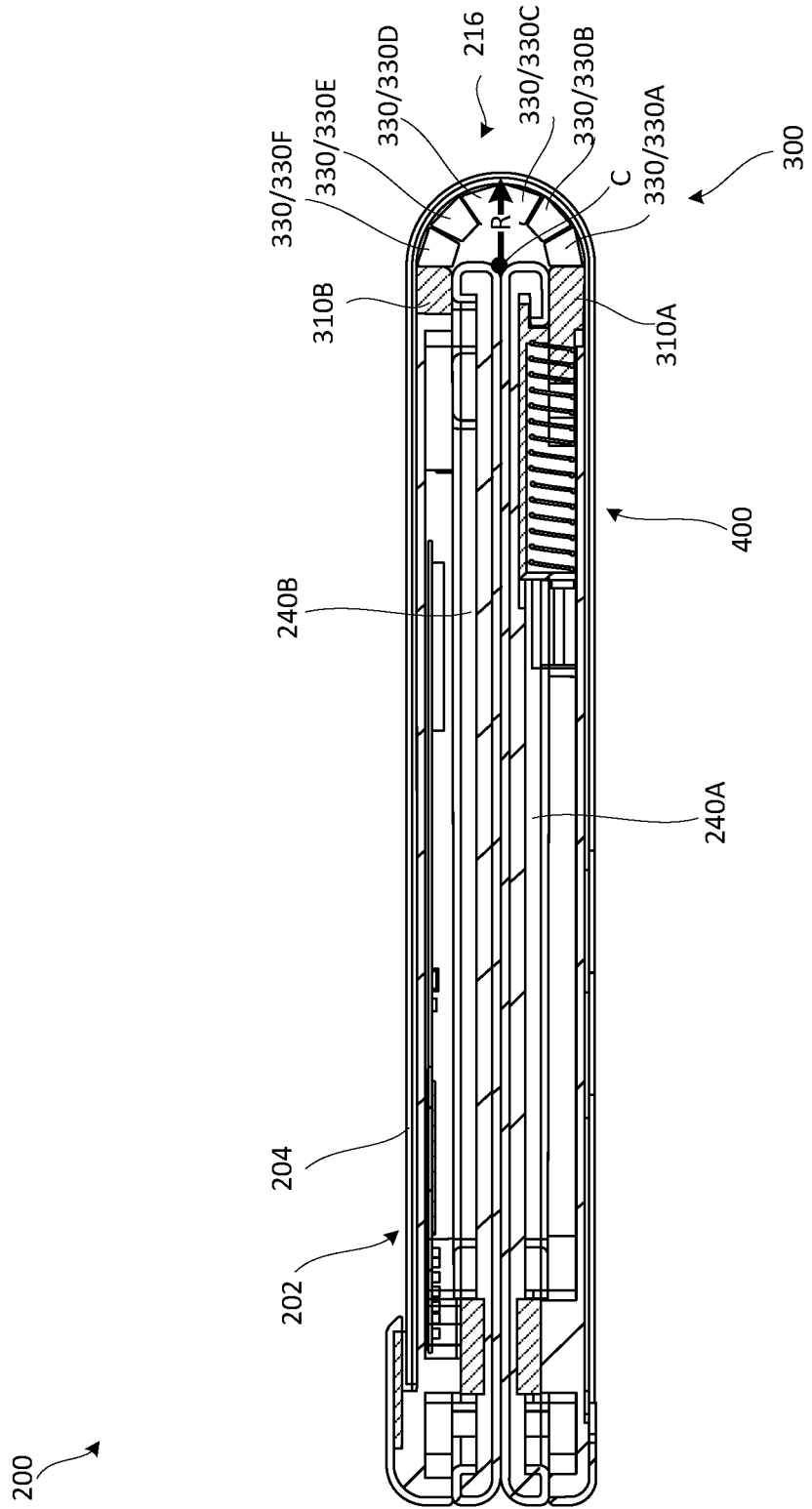
FIG. 4 is a cross-sectional view of the exemplary computing device shown in FIGS. 2A-3C, taken along line A-A of FIG. 2A, in accordance with implementations described herein.

FIG. 4 is a cross-sectional view of the exemplary computing device 200, taken along line A-A of FIG. 2A. FIGS. 5A-5I are schematic views of the hinge mechanism 300 transitioning from the substantially fully folded configuration (shown in FIG. 5A), to the substantially fully unfolded configuration (shown in FIG. 5H), in accordance with implementations described herein.

The hinge mechanism 300 may include a plurality of elongated hinge segments 330, or elongated joists 330. The plurality of elongated hinge segments 330, or elongated joists 330, may be longitudinally arranged, side by side, in a respective plurality of rows, in a portion of the computing device 200 corresponding to the bendable section 216 of the foldable display 202. In some implementations, a hinge segment 330A at a first end of the arrangement of the plurality of hinge segments 330 may be attached to a first hinge bracket 310A, coupled to a first body 240A of the computing device 200. In some implementations, a hinge segment 330F at a second end of the arrangement of the plurality of hinge segments 330 may be attached to a second hinge bracket 310B, coupled to a second body 240B of the computing device 200.

In some implementations, a cross-sectional shape, or a peripheral contour, of each of the plurality of hinge segments 330, or joists 330, may be arranged so as to accommodate the folding and the unfolding of the foldable display 202 in a desired manner. For example, in some implementations, the cross-sectional shape, or peripheral contour, of the plurality of hinge segments 330 may allow the plurality of hinge segments 330 to abut one another, as illustrated in the exemplary arrangement shown in FIGS. 4 and 5A, so as to correspond to an allowable bending radius R of the foldable display 202. In particular, the cross-sectional shape of the plurality of hinge segments 330, as well as, for example, a number of hinge segments 330, and other such factors, may cause the plurality of hinge segments 330 to abut each other in the folded configuration, with substantially no gaps between adjacent hinge segments 330 when the device 200 is in the folded configuration, to define a contour corresponding to an allowable bending radius R of the foldable display 202.

In some implementations, all of the hinge segments 300 may have substantially the same cross-sectional shape. In some implementations, the hinge segments 330 may have different cross-sectional shapes. In some implementations, a number of hinge segments 330 included in the hinge mechanism 300 may be determined based on, for example, an allowable size (for example, thickness, transverse dimension, and the like) of the computing device 200, the allowable bending radius R of the foldable display 202, and other such factors. In some implementations, some, or all, of the hinge segments 330 may be made of a relatively rigid material to provide a desired amount of stiffness and/or strength in the hinge segments 330 (and to the hinge mechanism 300), and a desired amount of planarity, or flatness to maintain flatness of the display 202 in the unfolded configuration. For example, in some implementations, the plurality of hinge segments 330 may be made of a stainless steel material, an injection molded liquid metal material, and the like. In some implementations, some, or all, of the plurality of hinge segments 330 may be substantially solid to enhance strength and/or stiffness of the hinge segments 330.

Figure 5A:
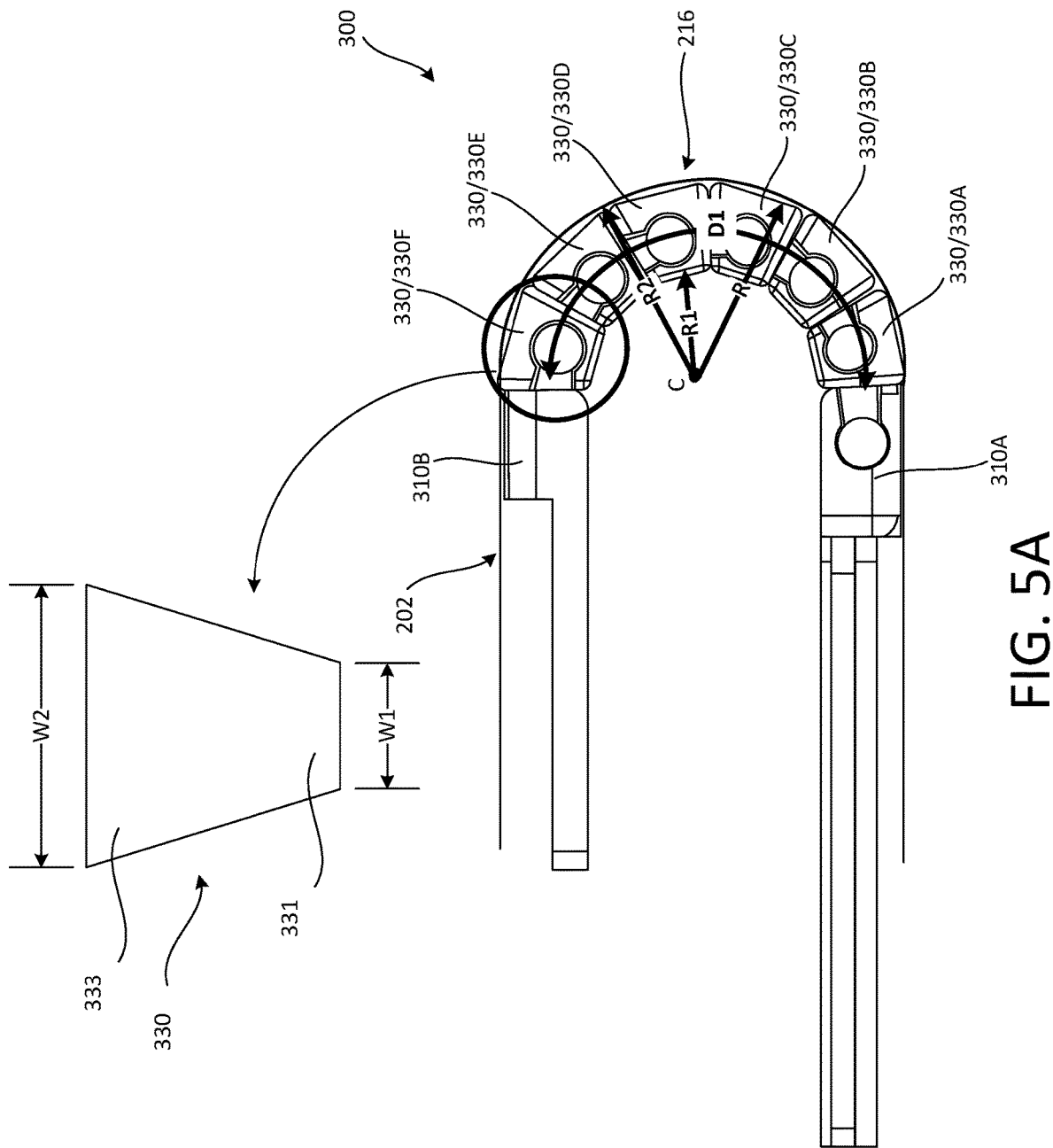
Figure 5B:
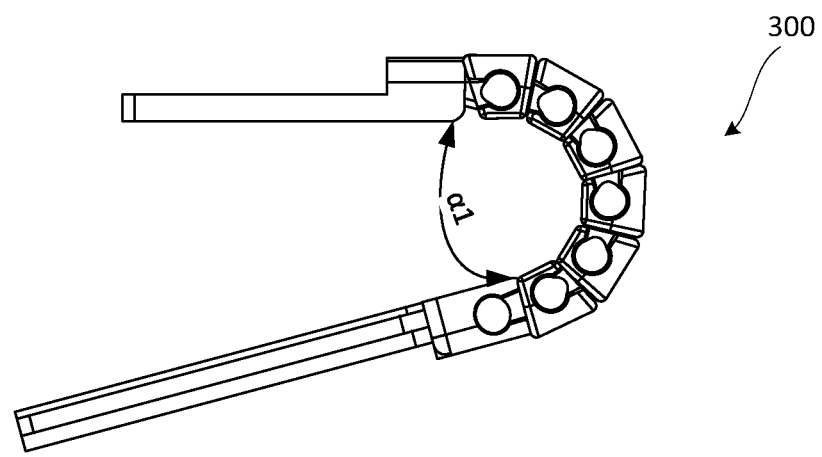
Figure 5C:
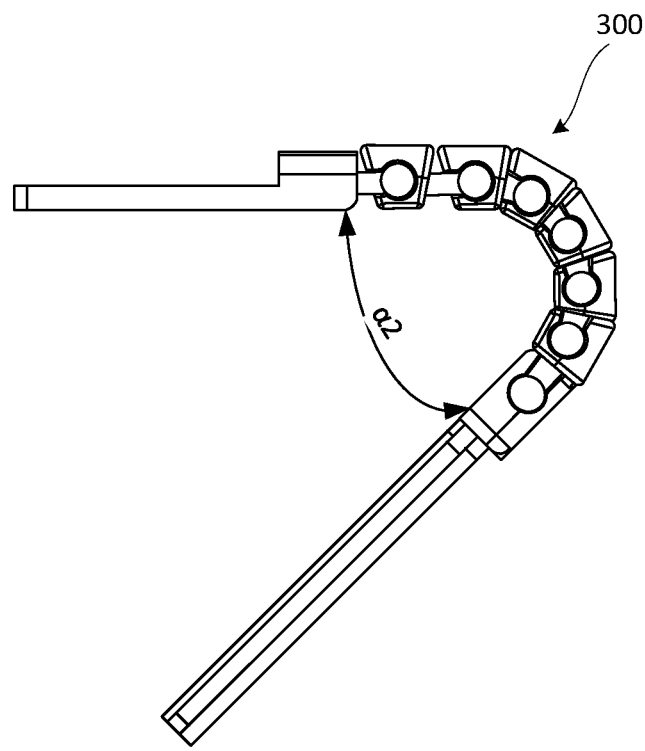
Figure 5D:
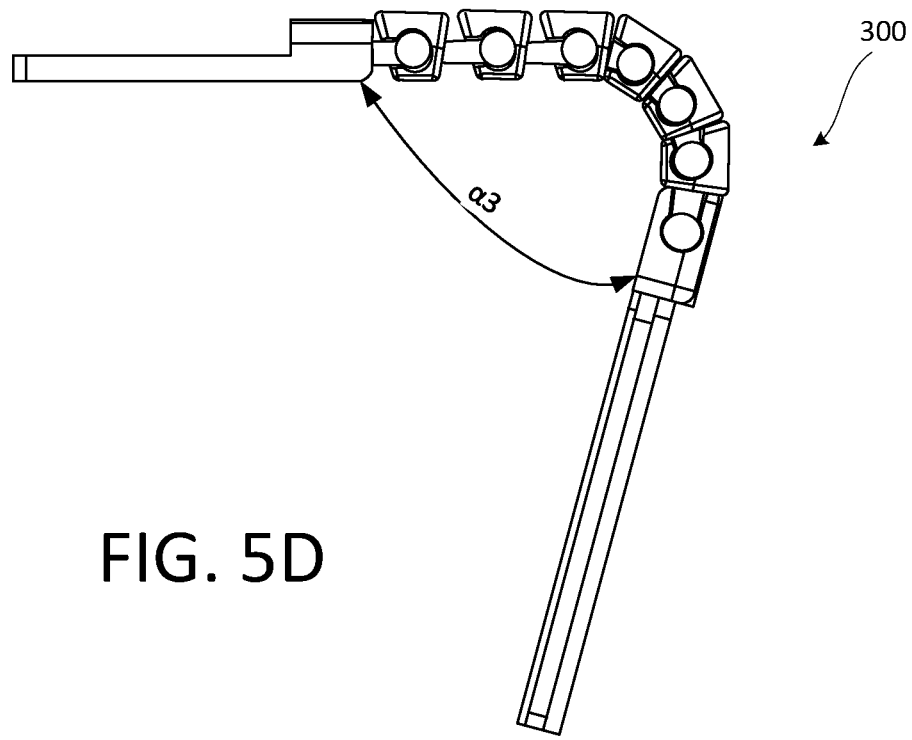
Figure 5E:
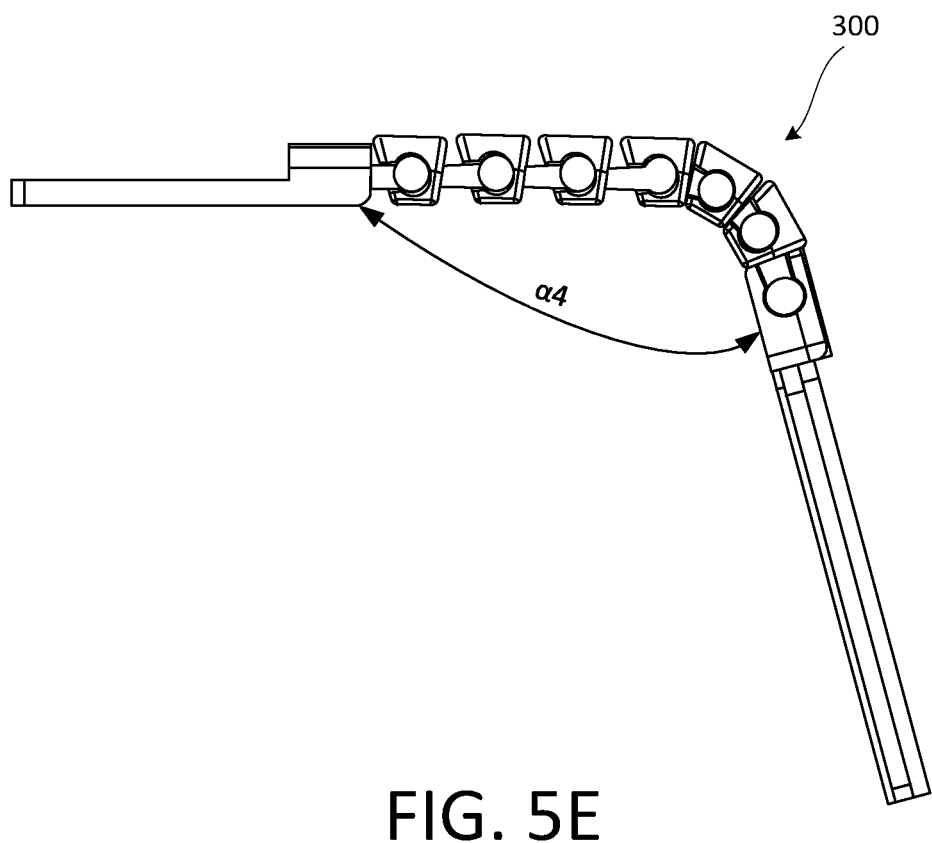
Figure 5F:
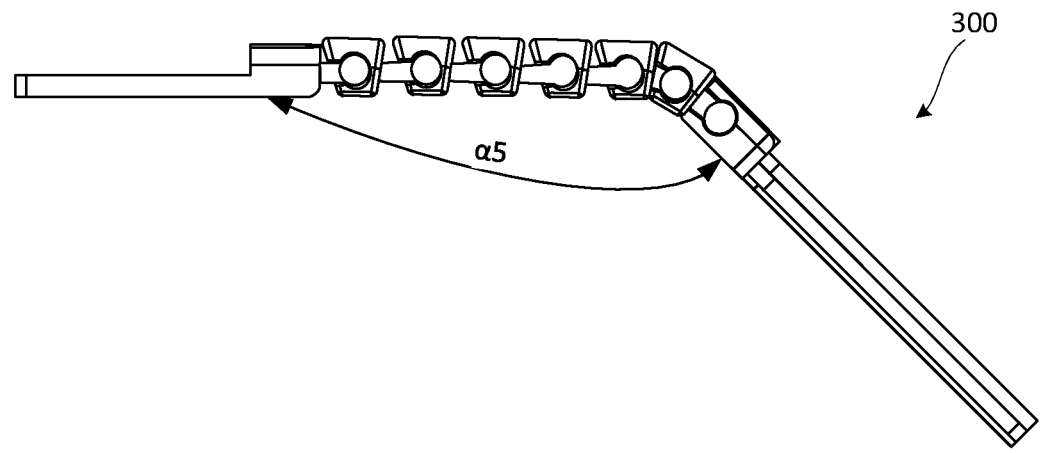
Figure 5G:
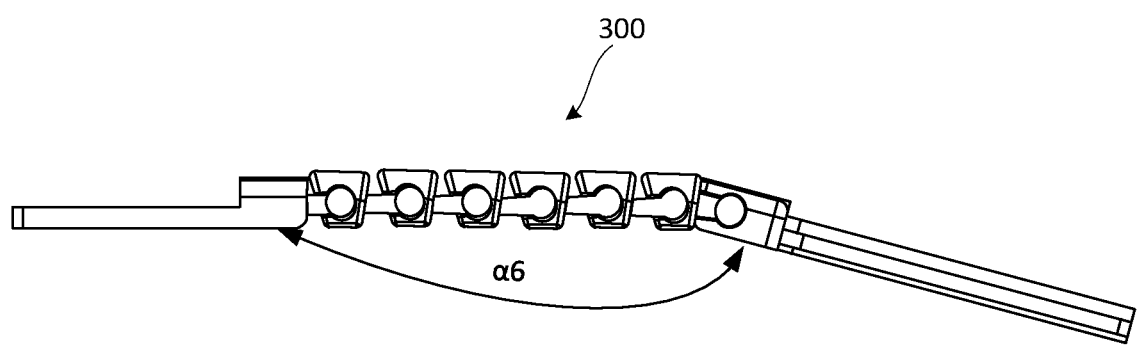

In the exemplary arrangement shown in FIGS. 5A-5H, the hinge mechanism 300 includes six elongated hinge segments 330, arranged substantially symmetrically about a central plane P of the hinge mechanism 300 (see FIG. 3A). The hinge mechanism 300 may include fewer than six, or more than six, hinge segments—for example, three, four, five, seven or eight etc. hinge segments—which may be similarly arranged substantially symmetrically about a central plane of the hinge mechanism 300. In this exemplary implementation, each of the hinge segments 330 has a cross-sectional shape, or peripheral contour, in which a width W1 of a first end portion 331 of the segment 330 (i.e., a width W1 of a first end portion 331 of the segment 330 defining a corresponding inner radius R1 of the hinge assembly 300 at the bendable section 216) is less than a width W2 of a second end portion 333 of the segment 330 (i.e., a width W2 of a second end portion 333 of the segment 330 defining a corresponding outer radius R2 of the hinge assembly 300 at the bendable section 216). The cross-sectional shape of the segments 330 may allow the segments 330 to abut one another, and form a desired shape, or contour, that supports and maintains the foldable display 202 within the allowable bending radius R, as shown in FIG. 5A. As can be seen in this figure, the cross-sectional shape of the segments 330 may be such that the sides of the segments 330 between the first end portion 331 and the second end portion 333 taper outwards from the width W1 of the first end portion 331 towards the width W2 of the second end portion 333. When in the folded configuration shown in FIG. 5A, these tapered surfaces may abut for stabilizing the segments in this position. In this exemplary arrangement, there is a distance D1, between the attachment of the segment 330A to the first bracket 310A and the attachment of the segment 330F to the second bracket 310B.

As noted above, the exemplary hinge mechanism 300 includes six hinge segments 330 having essentially the same cross-sectional shape, arranged substantially symmetrically about a central plane of the hinge mechanism 300. In some implementations, each hinge segment 330 may define a pivot point that pivots about the rotational center C of the hinge mechanism 300, and of the computing device 200. In the folded configuration, which the second body 240B is positioned substantially in parallel with the first body 240A (see FIG. 4), or, at essentially zero degrees with respect to the first body 240A. In this exemplary implementation, in the folded configuration, the hinge segments 330 provide support for an approximately 180 degree turn at the bendable section 216 of the foldable display 202, with each of the six segments 330 providing for approximately one-sixth, or an approximately equal portion of the support within the bendable section 216. The second body 240B (and component(s) attached thereto/therein) coupled to the second bracket 310B may be rotated away from the first body 240A coupled to the first bracket 310A, as shown in FIGS. 5B-5H through exemplary angles α1 through α6 in this example, to transition the computing device 200 from the folded configuration shown in FIG. 5A to the unfolded configuration shown in FIG. 5H. As the computing device 200 is unfolded in this manner, the plurality of segments 330 are rotated sequentially to support and guide a respective portion of the unfolding of the foldable display 202, as shown in FIGS. 5B-5H.

In the folded configuration, the plurality of hinge segments 330 provide support to the bendable section 216 of the foldable display 202, between the connection of the segment 330A to the first bracket 310A and the connection of the segment 330F to the second bracket 310B, along a distance D1. The distance D1 is shown in FIG. 5I, with the computing device 200 in the unfolded configuration, simply to illustrate this distance, in which the plurality of segments 330 abut each other (as in the folded configuration) without gaps therebetween, in a linear manner. In the unfolded configuration, the distance between the connection of the segment 330A to the first bracket 310A and the connection of the segment 330F to the second bracket 310B has increased, to a distance D2, due to the unfolding of the foldable display 202, and the difference between the folded radius R1 of the hinge segments 330, and the folded radius R2 of the foldable display at the outside of the hinge segments 330.

In some implementations, the plurality of hinge segments 330 may be translated relative to each other, to absorb the difference between the distance D1 in the folded configuration and the distance D2 in the unfolded configuration, in order to achieve the desired planarity, or flatness, of the foldable display 202, particularly in the bendable section 216. That is, in some implementations, the segments 330 may be translated such that gaps G are formed between adjacent segments 330 in the unfolded configuration to avoid warping and achieve the desired planarity, or flatness, of the foldable display 202 in the unfolded configuration. These gaps G are shown in FIG. 5H. Without such gaps G between the adjacent segments 330, warping or crimping of the foldable display 202, as shown in FIG. 5I, in which there are essentially no gaps between adjacent segments 330, may adversely impact the display quality of the foldable display 202, and may crimp the foldable display 202 beyond allowable bending limits, thus damaging fragile components of the foldable display 202. In some implementations, the relative translational movement of the segments 330 and resulting gaps G between adjacent segments 330 may be achieved by coupling devices coupling each set of adjacent segments 330. In some implementations, the sliding mechanism 400 may provide for the gaps G between adjacent segments 330. In some implementations, the sliding mechanism 400 may work together with the coupling device(s) to establish the gaps G between the adjacent segments 330 of the hinge mechanism 300 to achieve the desired planarity of the foldable display 202 in the unfolded configuration. In some implementations, a size of the gaps G between the adjacent segments 330 may be based on an amount needed, in excess of a sum of the widths W2 of the upper portions 333 of the hinge segments 330, to achieve the distance D2.

Figure 6A:
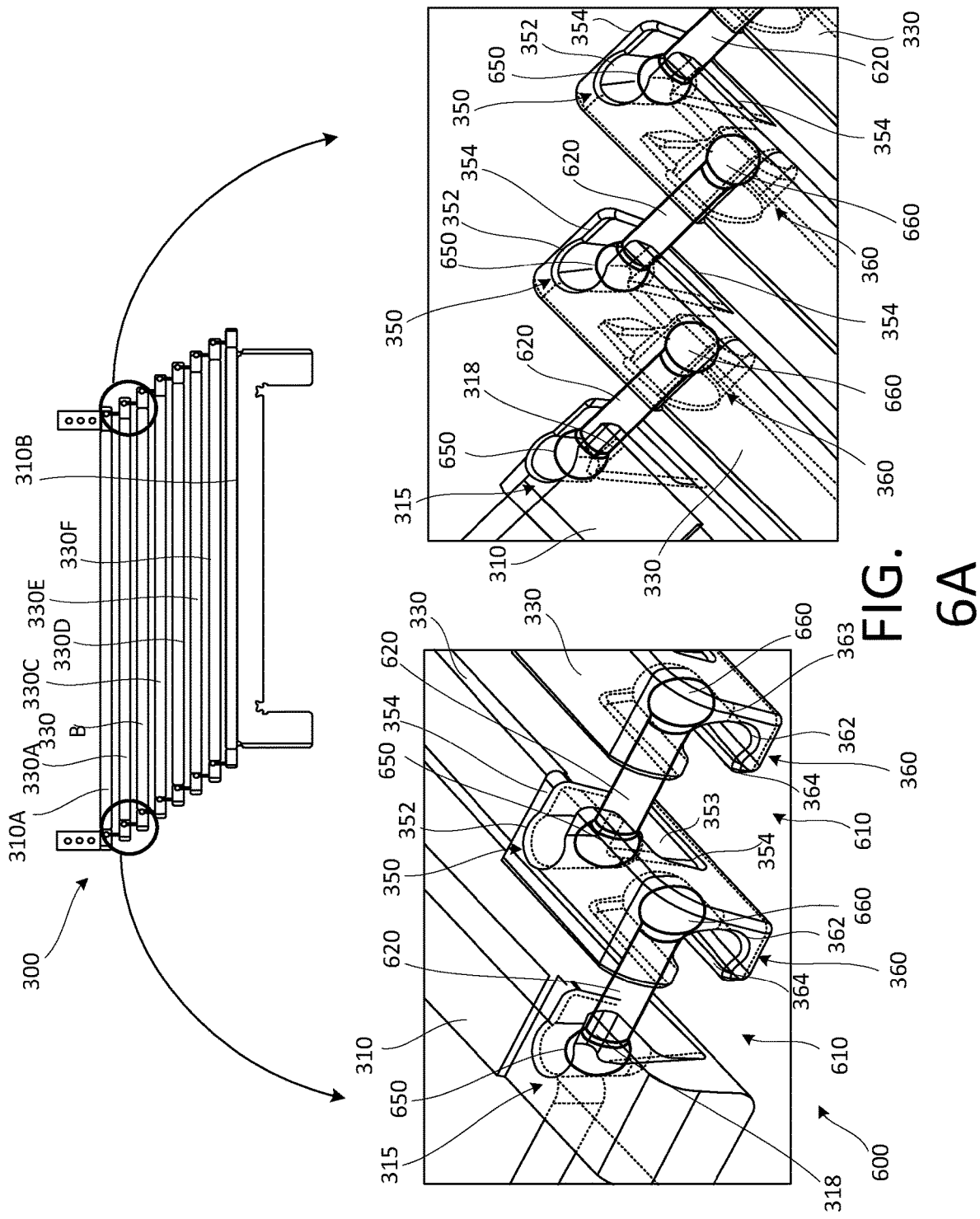
FIGS. 6A and 6B illustrate components of the exemplary hinge mechanism shown in FIGS. 5A-5I, in accordance with implementations described herein.
Figure 6B:
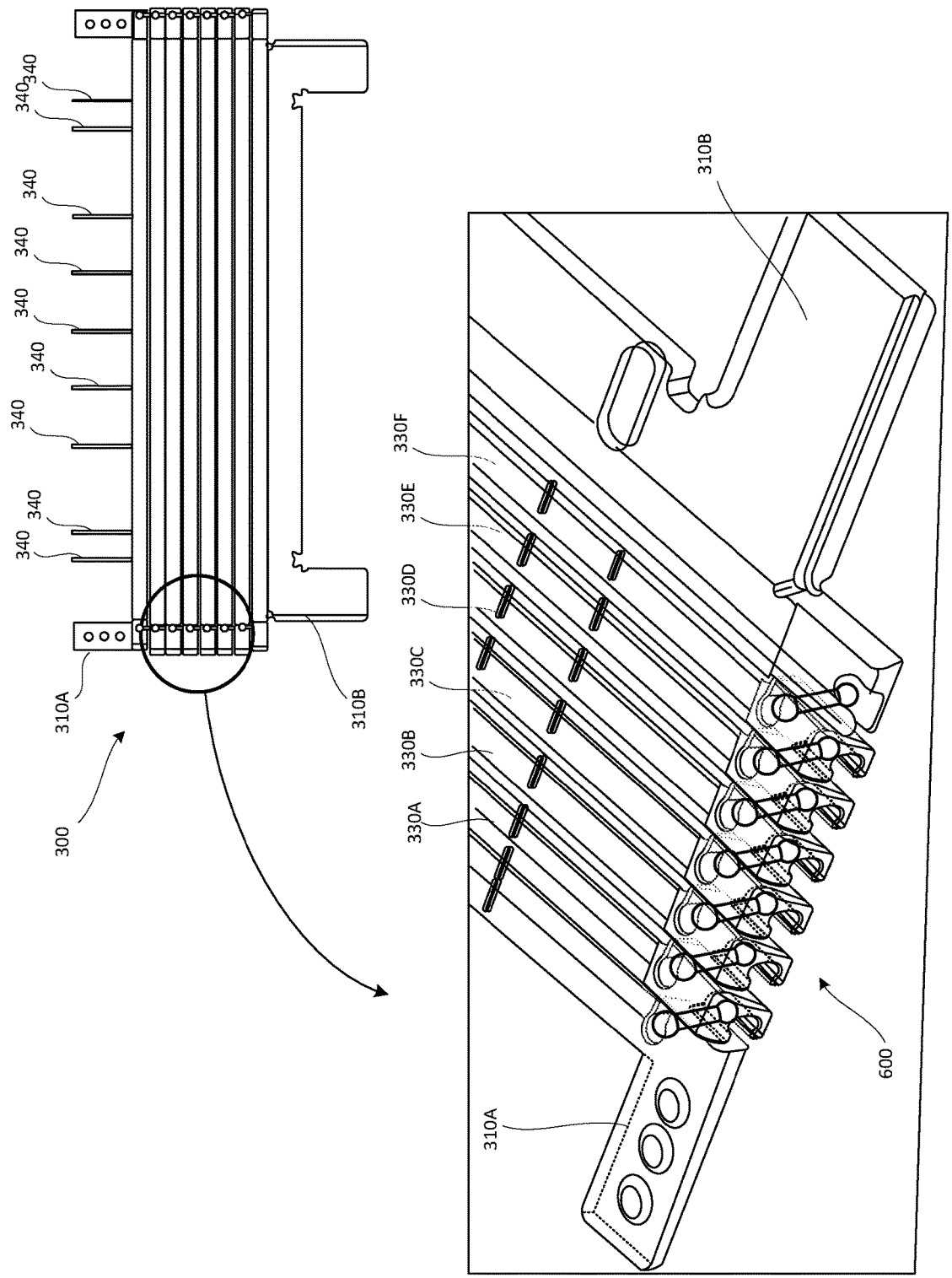

As noted above, in some implementations, coupling devices may movably couple the adjacent hinge segments 330 to each other to provide for relative translational movement of the hinge segments 330. As shown in FIGS. 6A-6B, in some implementations, the coupling devices may include a joint assembly 600 including a plurality of ball joints 610 that provide for translational movement of the plurality of hinge segments 330 relative to each other, and relative to the first and second brackets 310A, 310B of the sliding mechanism 400.

In some implementations, each ball joint 610 may include a rod 620 having a first ball 650 formed at a first end thereof, and a second ball 660 formed at a second end thereof. Each hinge segment 330 may include a first socket 350 having an enlarged access opening 352 formed in a first side of the segment 330, for example a first lateral side of the hinge segment 330, leading into a first channel 353, allowing the first ball 650 to be introduced into the first socket 350, and to move within and be retained in the first channel 353 by a slot 354. A dimension of the enlarged access opening 352 may be greater than a dimension of the slot 354, so that the ball 650 may be introduced into the first socket 350 through the opening 352, and at least partially retained in the first channel 353 by the slot 354. Each hinge segment 330 may include a second socket 360 on a second side of the hinge segment, for example, a second lateral side of the hinge segment 330, opposite the first side thereof. The second socket 360 may include an enlarged access opening 362 formed in a second side of the segment 330, leading into a second channel 363, allowing the ball 660 to be introduced into the second socket 360, and to move within and be retained in the second channel 363 by a slot 364. A dimension of the enlarged access opening 362 may be greater than a dimension of the slot 364, so that the ball 660 may be introduced into the second socket 360 through the opening 362, and at least partially retained in the channel 363 by the slot 364. The first ball 650 may be received in the first socket 350 formed in one segment 330, and the second ball 660 may be received in the second socket 360 formed in another, adjacent segment 330, to movably couple the pair of adjacent hinge segments 330.

For example, as illustrated in the arrangement shown in FIG. 6A, the first ball 650 of a first ball joint 610 may be inserted into the first socket 350 of a first hinge segment 330 through the access opening 352. The first ball 650 is movably received in the first socket 350 of the first hinge segment 330, and at least partially retained in the first socket 350, because the dimension of the slot 354 is smaller than that of the first ball 650, and large enough to allow for movement of the rod 620. The second ball 660 may be inserted into the second socket 660 of a second, adjacent hinge segment 330 through the access opening 362. The second ball 660 is movably received in the second socket 360 of the second hinge segment 330, and at least partially retained in the second socket 360, because the dimension of the slot 364 is smaller than that of the second ball 660 and large enough to allow for movement of the rod 620. Similarly, the first ball 650 of a second ball joint 610 is received in the first socket 350 of the second hinge segment 330, and the second ball 660 is received in the second socket 660 of a third, adjacent hinge segment 330. A similar arrangement of ball joints 610 coupled in sockets 350, 360 of the remaining hinge segments 330 may be used to movably couple the remaining hinge segments 330 to each other.

As shown in FIGS. 6A-6B, a dimension, for example, a diameter, of the rod 620 may be smaller than a dimension, for example, a diameter, of the balls 650, 660 formed at the respective end portions thereof. This may allow the balls 650, 660 to slide into the respective sockets 350, 360 through the enlarged access openings 352, 362. As noted above, a dimension of the slots 354, 364 may be smaller than that of the enlarged openings 352, 362, and smaller than that of the channels 353, 363, and smaller than that of the balls 350, 360, so as to at least partially retain the balls 650, 660 within the respective channels 353, 363. That is, a contour of the channels 353, 363 and slots 354, 364 may be tapered, so that an interior dimension of the channels 353, 363 may be large enough (i.e., just slightly larger than the balls 650, 660) to allow the balls 650, 660 to slide into and within the channels 353, 363, while a dimension of the slots 354, 364 may be small enough (i.e., smaller than the balls 650, 660) to retain the balls 650, 660 in the channels 353, 363. This may allow for three dimensional movement of the balls 650, 660 within the respective sockets 350, 360, and for movable coupling of the plurality of hinge segments 330.

In some implementations, additional structure may at least partially retain the balls 650, 660 in the respective sockets 350, 360. For example, in some implementations, a portion of a flexible cover of the computing device 200 (not shown in FIGS. 6A-6B) may abut an edge portion of each of the plurality of segments 330, and/or an inward facing surface of the foldable display 202 may abut a corresponding upper surface of the plurality of segments 330, to at least partially retain the balls 650, 660 in the respective sockets 350, 360.

In some implementations, each of the balls 650, 660 can rotate in the respective socket 350, 360. Rotation of the balls 650, 660 in the respective sockets 350, 360 may allow for bending of the hinge mechanism 300 in a desired direction. In some implementations, each of the ball joints 610 can move linearly in the respective socket 350, 360, with the linear movement guided by the rod 620 received through the respective slot 354, 364. This movement may allow for linear separation between adjacent hinge segments 330, for example, to achieve gaps, G, between adjacent hinge segments 330. In some implementations, various factors, such as, for example, a size of the ball joints 610, a length of the slots 354, 364, and other such factors, may limit an amount of bending the foldable display 202 may experience in the bendable section 216.

In some implementations, a socket 315 may be formed in the first bracket 310A and the second bracket 310B, at opposite ends of the brackets 310. For example, where the hinge segments 330 are elongate, each having a length that defines a first end and a second end, the brackets 310 may also be elongate, each having a length and a cooperating first end and second end when the hinge segments connect to the brackets 310. In this case, the first bracket may have a socket 315 formed at its first end or at its second end, and the second bracket may have a socket 315 formed at its second end or at its first end respectively i.e. at opposite ends. The first ball 650 of the ball joint 610 connecting the first hinge segment 330A to the first bracket 310A may be rotatably received in the socket 315 formed in the first bracket 310A. In some implementations, movement of the first ball 650 may be limited to rotation within the socket 315, so that linear movement of the first hinge segment 330A relative to the first bracket 310A is limited. In some implementations, a tip 318 may be formed in the first bracket 310A and the second bracket 310B (for example, at one end of the bracket 310, or at each end of the bracket 310). The tip 318 may extend across the top of the respective socket 315, to limit rotation of the bendable display 202 beyond 180 degrees, i.e., beyond the fully open configuration. This arrangement is shown in detail for the first bracket 310A and the hinge segment 330A in FIG. 6A. A similar arrangement (not shown) may apply to the attachment of the hinge segment 330F to the second bracket 310B.

Exemplary arrangement of the ball joints 610 in the sockets 350, 360 of adjacent hinge segments 330 has been explained with respect to an end portion of the arrangement of hinge segments 330. Similar structure, and interaction of the components of the ball joints 610 and sockets 350, 360 of the adjacent hinge segments 330, may be applied to an opposite end portion of the arrangement of hinge segments 330 in a similar manner. Likewise, exemplary arrangement of the ball joint 610 in the socket 315 of the first bracket 310A has been explained with respect to an end portion of the first bracket 310A/hinge segment 330A. Similar structure, and interaction of the components of the ball joint 610 and socket 315, may be applied to an opposite end portion of the first bracket 310A and the hinge segment 330A, as well as to the coupling of the hinge segment 330F and the second bracket 310B.

In this manner, the plurality of hinge segments 330 may be coupled, while allowing for rotatable movement of the hinge segments 330 to support and guide the folding and unfolding of the computing device 200/foldable display 202. In this manner, the plurality of hinge segments 330 may be coupled, while allowing for linear movement of the hinge segments 330, so that the distance between the first bracket 310A and the second bracket 310B may change (as described with respect to FIGS. 5A-5H), i.e., between the distance D1 and the distance D2, as the computing device 200/foldable display 202 is folded and unfolded.

In some implementations, sizing of the plurality of ball joints 610, and of the plurality of hinge segments 330 and sockets 350, 360 formed therein, and/or a number of hinge segments 330, may be based on, for example, a size and/or a thickness of the foldable display 202, an allowable bending radius of the foldable display 202 and other such factors. For example, in some implementations, a diameter of the rod 620 of the ball joint 610 may be approximately 0.8 mm, and a diameter of the balls 650, 660 may be approximately 1.2 mm, with the enlarged access openings 352, 362 and the slots 354, 364 sized accordingly. In some implementations, the diameter of the rod 620 may be smaller than approximately 0.8 mm, or larger than approximately 0.8 mm, and the diameter of the balls 650, 660 may be (greater than that of the rod 620 and) smaller than approximately 1.2 mm, or (greater than that of the rod 620 and) greater than approximately 1.2 mm, with the enlarged access openings 352, 362 and the slots 354, 364 sized accordingly.

FIG. 6A illustrates the plurality of hinge segments 330 rotatably/movably coupled by the plurality of joint assemblies 610 as described above, in an extended state, or a state in which the plurality of segments are spaced apart, linearly, i.e., with gaps between adjacent segments 330 (as shown in FIG. 5H). FIG. 6B illustrates the plurality of hinge segments 330, rotatably/movably coupled by the joint assembly 600 as described above, in a state in which the plurality of segments 330 have been moved together, linearly, with the hinge mechanism 300 in the fully assembled state. As shown in FIG. 6B, in some implementations, one or more spring wires 340 may extend through the plurality of hinge segments 330 to, for example, maintain a relative positioning or alignment of the plurality of hinge segments 330. In some implementations, the spring wire(s) 340 may extend between the first bracket 310A and the second bracket 310B. In some implementations, opposite ends of the spring wire(s) 340 may be coupled to, or fixed to, the first bracket 310A and the second bracket 310B, respectively. In some implementations, more, or fewer, spring wires 340 than illustrated in the exemplary computing device 200 may be connected between the first bracket 310A and the second bracket 310B. In some implementations, the spring wire(s) 340 may be electrical wire(s) providing for power connection/communication and/or data connection/communication between the first body 240A and the second body 240B (not shown in FIG. 6B). In some implementations, the spring wire(s) 340 may be made of a material having a relatively high modulus of elasticity, to support the movement of the hinge segments 330 as described above, and to support a relatively high level of cyclic loading (for example, on the order of 200,000 bending cycles or more). For example, in some implementations, the spring wire(s) 340 may be made of a super-elastic metal, such as, for example, Nitinol. In some implementations, the spring wire(s) 340 may be made of another type of material and/or a variety of different materials. In some implementations, a relatively thin elastomer sheet (not shown) may extend between the first and second brackets 310A, 310B to reinforce the arrangement of the plurality of hinge segments 330. For example, the elastomer sheet may cooperate with a plane defined by the plurality of hinge segments 330 between the brackets 310.

As described above, gaps G may be formed between adjacent hinge segments 330 in the unfolded configuration, to account for the difference between the pivot radius R1 of the hinge segments 330 and the pivot radius R2 of the display 202. In some implementations, the sliding mechanism 400, in accordance with implementations described herein, may provide for additional linear adjustment of the position(s) of the hinge segments 330, and the distance between the first and second brackets 310A, 310B in the unfolded configuration. This may provide for fine tuning of the spacing between adjacent hinge segments 330 and/or the first and second brackets 310A, 310B, and may provide for planarity of the foldable display 202.

Figure 7A:
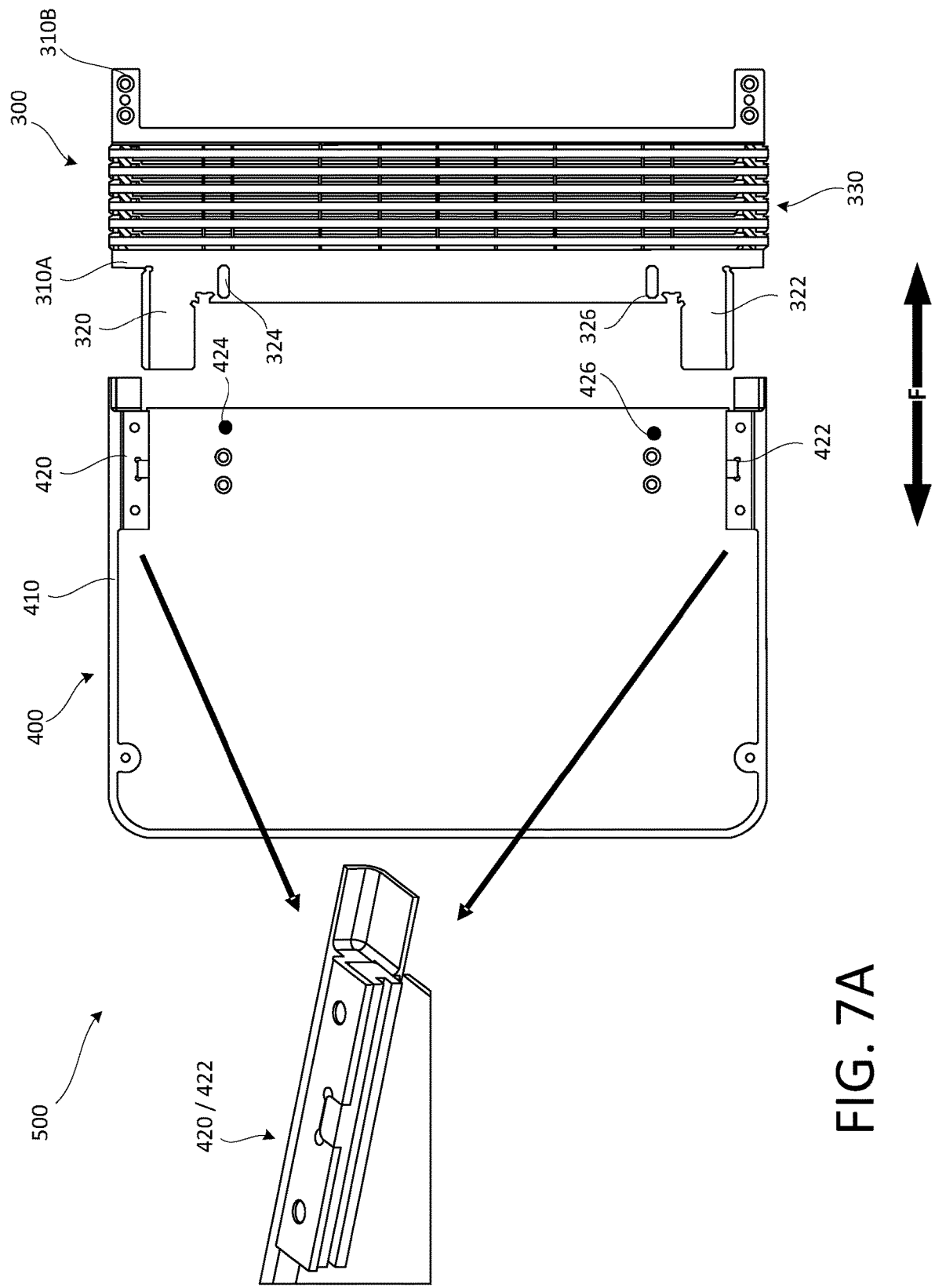
Figure 7B:
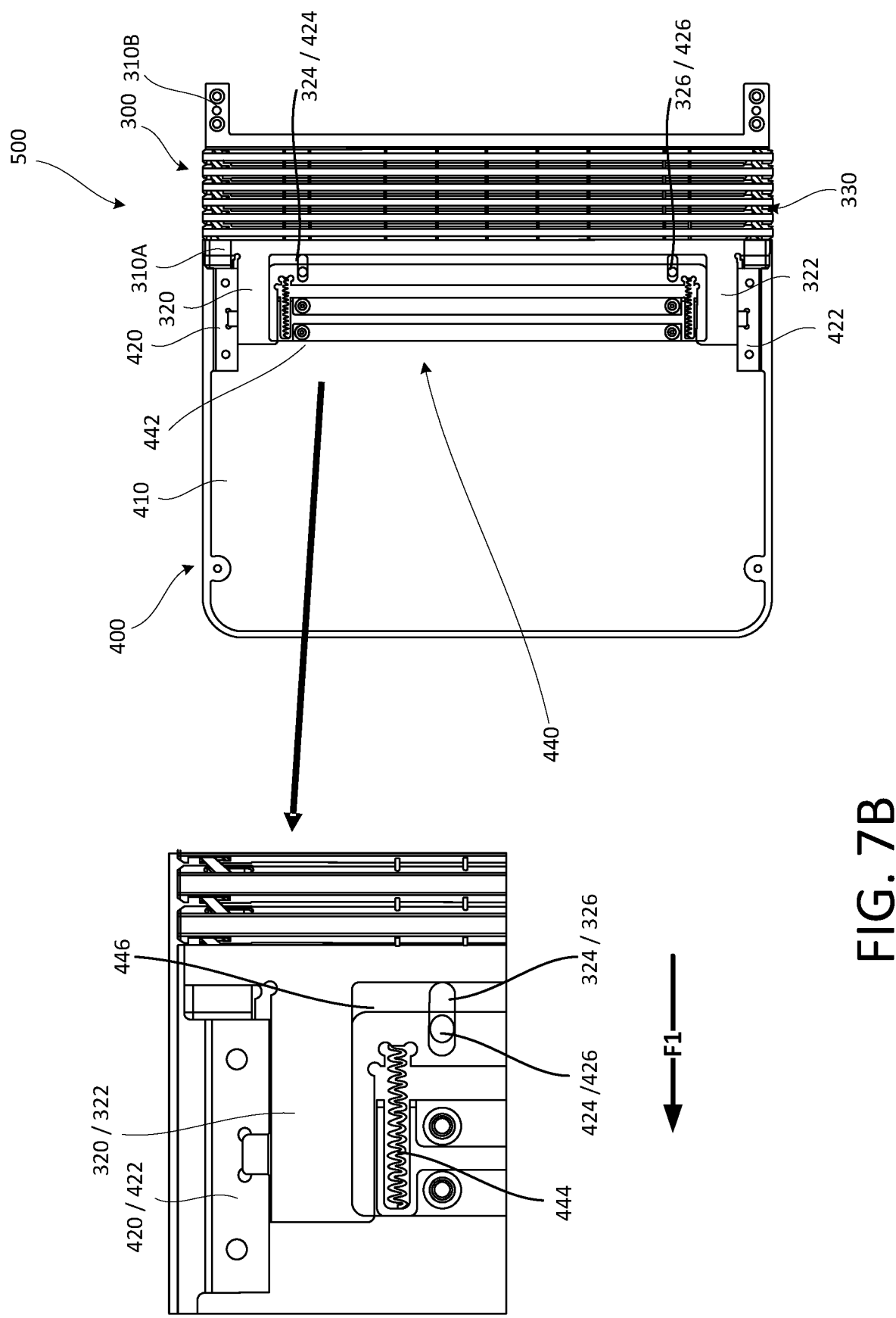
Figure 7D:
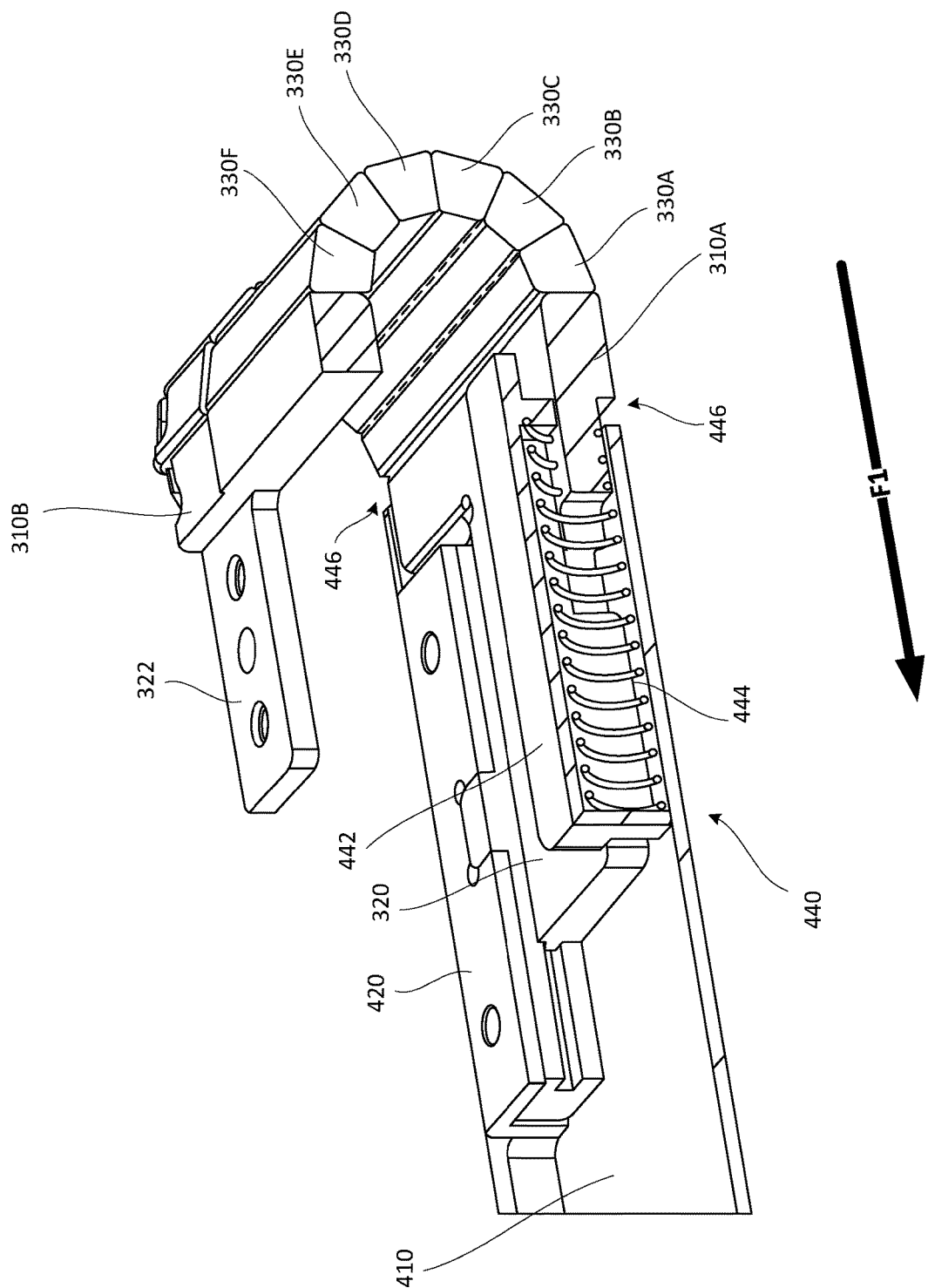

FIGS. 7A-7C illustrate the coupling of the hinge mechanism 300 and the sliding mechanism 400, in accordance with implementations described herein. FIG. 7D is a cross-sectional view of the coupling of the hinge mechanism 300 and the sliding mechanism 400, taken along line A-A of FIG. 2A. The foldable display 202 is not shown in FIGS. 7A-7D, so that components of the hinge mechanism 300 and the sliding mechanism 400 are more easily visible. As shown in FIGS. 7A and 7B, the first bracket 310A may be slidably coupled to a sliding member 410 of the sliding mechanism 400. As shown in FIG. 7C, the second bracket 310B may be coupled, for example, fixedly coupled, to a support member 470. The coupling of the first bracket 310A to the sliding member 410, and of the second bracket 310B to the support member 470, may couple, for example, slidably couple, the hinge mechanism 300 and the sliding mechanism 400.

In some implementations, the sliding member 410 includes a first coupling recess 420 at first end portion of the sliding member 410, to slidably receive a first arm 320 of the first bracket 310A. The sliding member 410 may also include a second coupling recess 422 at a second end portion of the sliding member 410, to slidably receive a second arm 322 of the first bracket 310A. The coupling of the first and second arms 320, 322 of the first bracket 310A in the first and second coupling recesses 420, 422 of the sliding member 410 may support and guide relative movement, for example, linear sliding movement, of the hinge mechanism 300 relative to the sliding mechanism 400. In some implementations, the sliding member 410 may include a first pin 424 that is slidably received in a first slot 324 defined in the first bracket 310A. In some implementations, the sliding member 410 may also include a second pin 426 that is slidably received in a second slot 326 defined in the first bracket 310A. The engagement and movement of the first pin 424 in the first slot 324 (and/or the second pin 426 in the second slot 326) may prevent the decoupling of the first bracket 310A and the sliding member 410. The engagement and movement of the first pin 424 in the first slot 324 (and/or the second pin 426 in the second slot 326) may limit the linear movement of the first bracket 310A and the sliding member 410.

In some implementations, a biasing module 440 may be coupled between the first bracket 310A and the sliding member 410. The biasing module 440 may include a cover 442 that is fixed to the sliding member 410. As the sliding member 410 is slidably coupled to the first bracket 310A as described above, the biasing module 440 is linearly movable, together with the sliding member 410, relative to the first bracket 310A. At least one elastic member 444, such as, for example, a coil spring 444, may be installed in a space defined by the cover 442, the sliding member 410, and the first bracket 310A. In the example shown in FIGS. 7B and 7C, the biasing module 440 includes a first coil spring 444 at a first end of the biasing module 440, proximate the first arm 320 of the first bracket 310A, and a second coil spring 444 at a second end portion of the biasing module 440, proximate the second arm 322 of the first bracket 310A. In some implementations, the biasing module 440 may include more, or fewer, elastic members 444, or coil springs 444, in various sizes and/or arrangements. In an arrangement including multiple coil springs 444, the multiple coil springs 444 act in parallel to each other.

The spring(s) 444 may bias, or urge, the sliding member 410 in a direction F1 relative to the first bracket 310A/hinge mechanism 300, in both the folded configuration and in the unfolded configuration. A gap 446 between the sliding member 410 and the first bracket 310A, may limit an amount of movement, for example, linear movement of the sliding member 410 relative to the first bracket 310A in response to the biasing provided by the spring(s) 444. In some implementations, the gap 446 may be, for example, approximately 2.0 mm. In some implementations, a size of the gap 446 may be determined by numerous factors, such as, for example, a size of the foldable display 202, relative size(s) of the components of the hinge mechanism 300 and/or the sliding mechanism 400, and other such factors. As such, in some implementations, the gap 446 may be greater than approximately 2.0 mm, or less than approximately 2.0 mm.

In the folded configuration, the biasing provided by the biasing module 440 may help to ensure that the plurality of hinge segments 330 are arranged so as to provide support to the bendable section 216 of the foldable display 202 and to maintain a desired contour. For example, in the folded configuration, the biasing provided by the biasing module 440 may position and help maintain the position of the plurality of hinge segments 330, with adjacent hinge segments 330 abutting each other. In the unfolded configuration, the biasing provided by the biasing module 440 may help to stabilize a position of the plurality of hinge segments 330, and the gaps G formed therebetween, to provide for the desired flatness in the bendable section 216 of the foldable display 202. In some implementations, the biasing provided by the biasing module 440 may provide for refinement in the transition between the distance D1 and the distance D2 to achieve the desired planarity of the foldable display 202. For example, the biasing provided by the biasing module 440 may absorb slack remaining in the foldable display 202 when the computing device 200 is transitioned between the folded configuration and the unfolded configuration.

As shown in FIG. 7C, the second bracket 310B may be coupled, for example, fixedly coupled, to a support member 470. The second bracket 310B and the support member 470 may be coupled by one or more fasteners 472 such as, for example, screws and the like. In the example shown in FIG. 7C, fasteners 472 are shown at first and second ends of the second bracket 410B and support member 470, simply for purposes of discussion and illustration. More, or fewer, fasteners, in different arrangements than shown, may couple the second bracket 310B and the support member 470. Thus, in the exemplary implementation illustrated in FIGS. 7A-7D, the sliding member 410 is movable relative to the hinge mechanism 300, and the support member 470 moves together with the hinge mechanism 300.

Figure 8A:
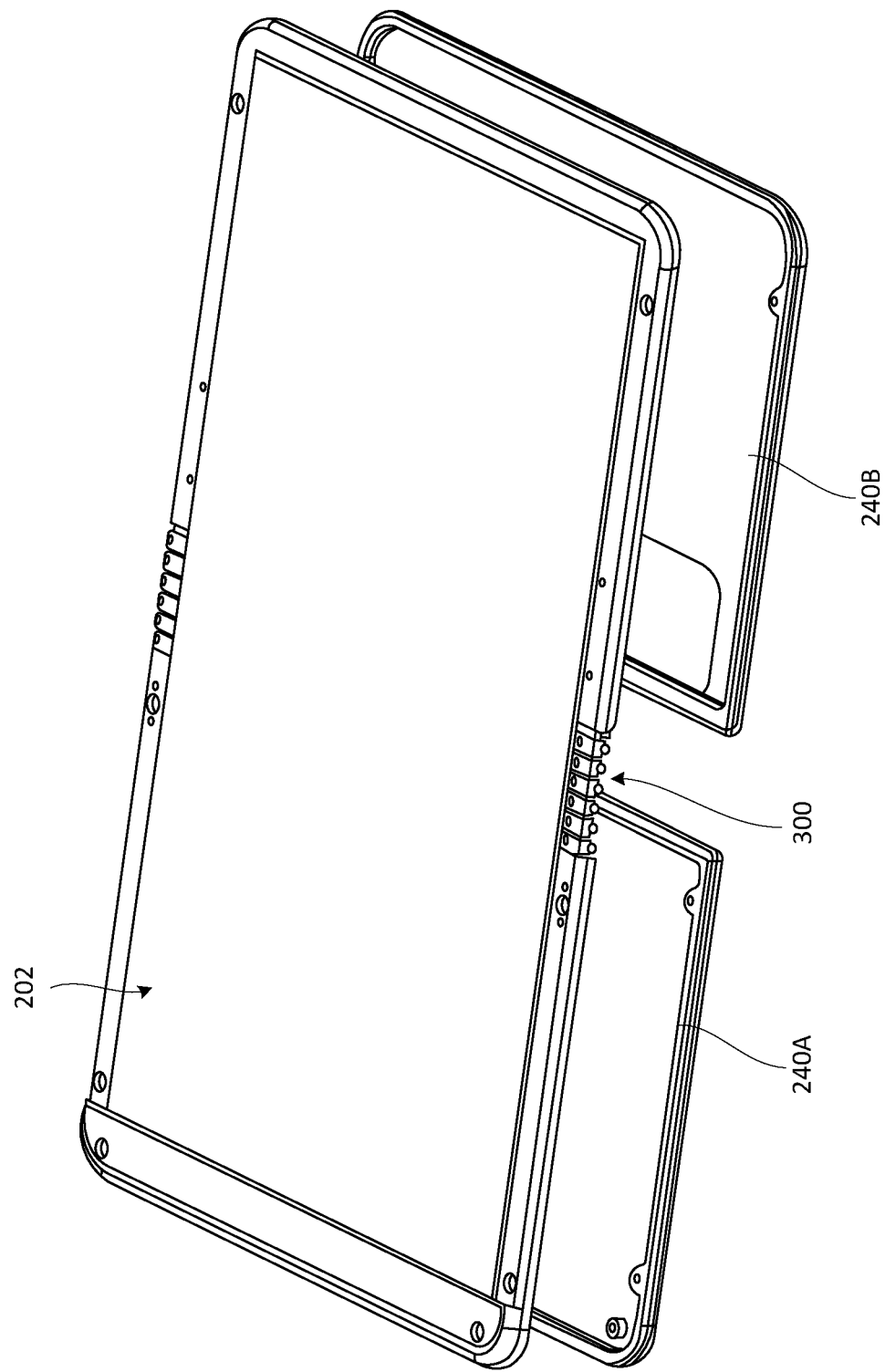
FIGS. 8A-8D illustrate assembly of the exemplary computing device including the exemplary hinge mechanism and the exemplary sliding mechanism, in accordance with implementations described herein.
Figure 8B:
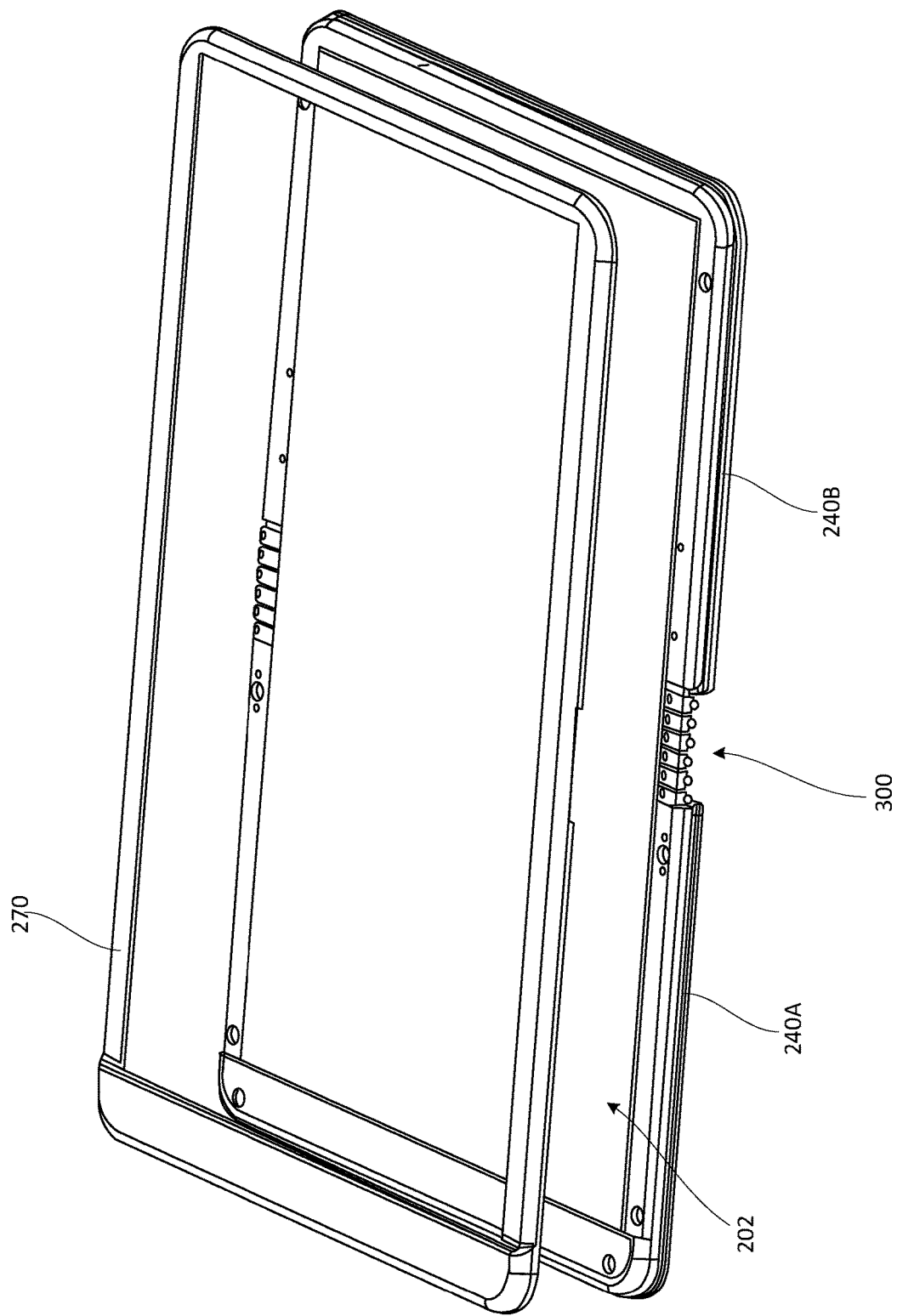
Figure 8C:
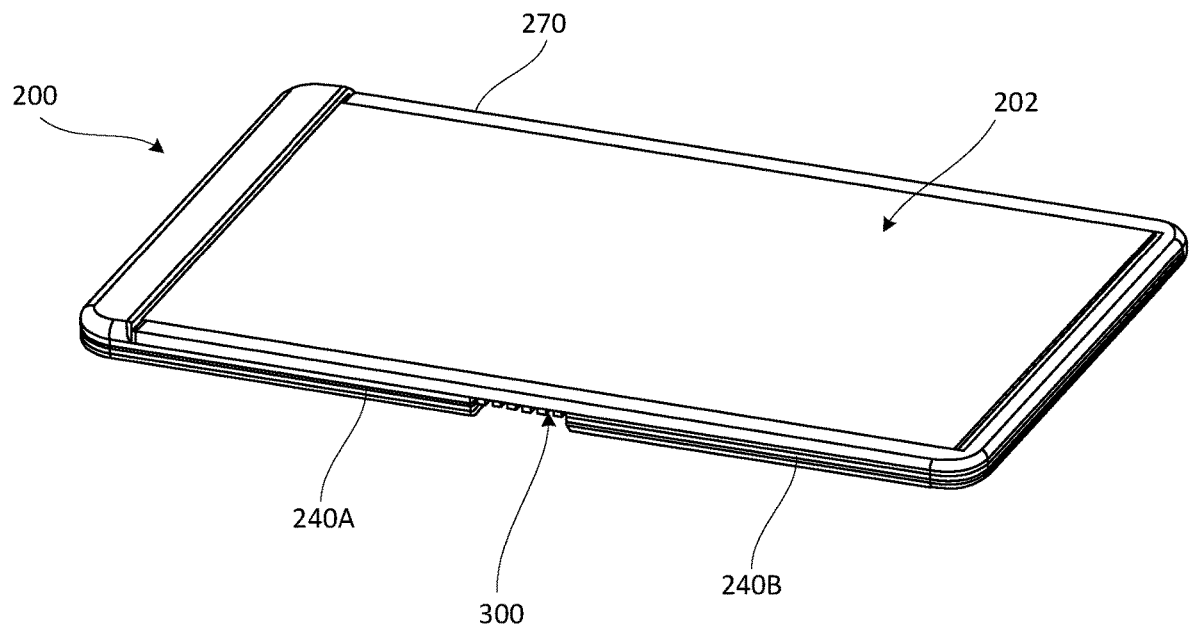
Figure 8D:
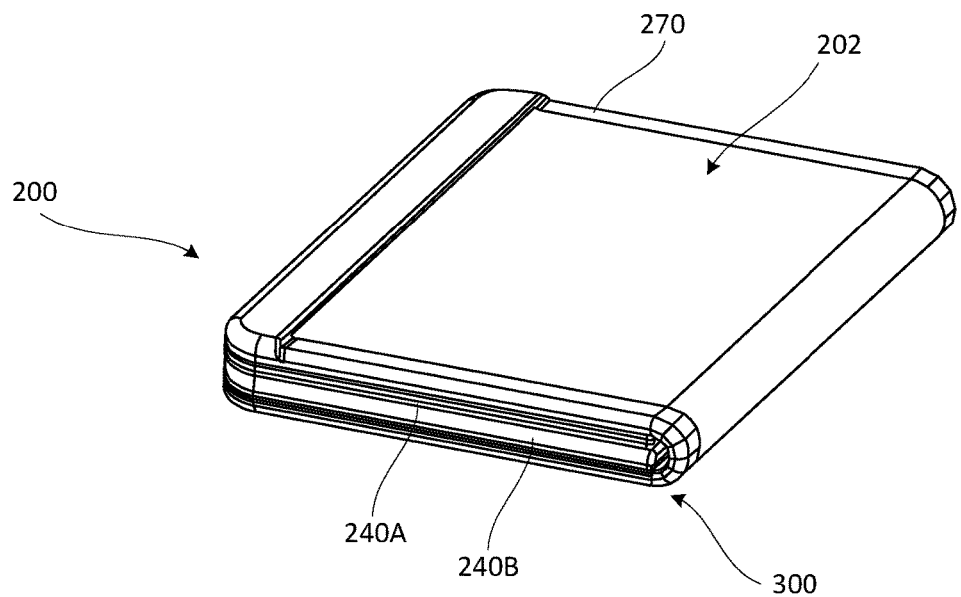

FIG. 8A is a perspective view of the foldable display 202 mounted on the hinge mechanism 300 and the sliding mechanism 400, separated from the first body 240A and the second body 240B of the computing device 200. As shown in FIGS. 8B and 8C, in some implementations, a framing member 270 may be coupled on the assembled components of the computing device 200 (i.e., the foldable display 202, hinge mechanism 300, sliding mechanism 400, first body 240A and the second body 240B). In some implementations, the framing member 270 may reinforce the coupling of the components of the computing device 200 as described above. In some implementations, the framing member 270 may provide for secondary alignment and retention of the hinge segments 330. The framing member 270 may provide for a finished external appearance of the computing device 200. In some implementations, the framing member 270 may be made of an elastomer material, to provide for flexibility, bending, elastic deformation and the like, particularly in portions of the computing device 200 corresponding to the foldable display 202, so as to adapt to the folded configuration of the computing device 200, as shown in FIG. 8D.

In a computing device including a hinge mechanism and a sliding mechanism, in accordance with implementations as described herein, a relatively simple, and relatively reliable foldable computing device may be provided, whereby the hinge mechanism and the sliding mechanism may support the folding and unfolding of a foldable display, with a relatively natural motion, while also providing for planarity of the foldable display in the unfolded configuration, particularly in the bendable section of the foldable display. The hinge mechanism and the sliding mechanism may accomplish this without the use of complicated gearing which add cost and complexity, which produce a relatively unnatural, restrictive folding and unfolding motion, and which may detract from the utility and reliability of the computing device. This relatively simple and reliable hinge mechanism and sliding mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, may be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism, comprising:
    a plurality of hinge segments, arranged in a row, each hinge segment including a socket formed in the hinge segment; and
    a joint assembly including a plurality of ball joints, each ball joint of the plurality of ball joints being configured to movably couple a pair of adjacent hinge segments of the plurality of hinge segments, such that the pair of adjacent hinge segments are movable relative to each other, each ball joint of the plurality of ball joints including:
        a rod;
        a first ball at a first end portion of the rod; and
        a second ball at a second end portion of the rod,
    wherein a diameter of the first ball is greater than a diameter of the rod, and a diameter of the second ball is greater than the diameter of the rod,
    wherein the first ball is movably received in a socket formed in a first hinge segment of the pair of adjacent hinge segments, and the second ball is movably received in a socket of the second hinge segment of the pair of adjacent hinge segments, so as to movably couple the pair of adjacent hinge segments, and
    wherein the hinge mechanism is configured to be installed in a housing of a computing device, at a position corresponding to a bendable section of a foldable display of the computing device.

2. The hinge mechanism of claim 1, wherein the socket formed in each of the plurality of hinge segments includes:
    a channel defined within the hinge segment;
    a slot defined in a side portion of the hinge segment, at a position corresponding to the channel; and
    an opening at an end portion of the of the socket, connected to the channel within the hinge segment.

3. The hinge mechanism of claim 2, wherein
    an interior dimension of the channel is greater than the diameter of the ball received therein such that the ball received therein is movable along a length of the channel,
    a dimension of the slot is less than the interior dimension of the channel, and less than the diameter of the ball received therein, so as to laterally retain the ball received in the channel formed in the socket of the hinge segment.

4. The hinge mechanism of claim 2, wherein
    a dimension of the opening is greater than the diameter of the ball, such that the ball is introduced into the channel of the socket through the opening, and
    a dimension of the slot at a position corresponding to the opening is less than the diameter of the ball, such that the ball is laterally retained in the channel defining the socket.

5. The hinge mechanism of claim 2, wherein the ball is slidable within the channel of the socket in which it is received, and the ball is movable in three dimensions in the socket in which it is received.

6. The hinge mechanism of claim 3, wherein, in a folded configuration of the hinge mechanism,
    the first ball is positioned at a first end portion of the socket of a first hinge segment of the pair of adjacent hinge segments, and
    the second ball is positioned at a first end portion of the socket of a second hinge segment of the pair of adjacent hinge segments.

7. The hinge mechanism of claim 6, wherein, in an unfolded configuration of the hinge mechanism, the plurality of hinge segments are movable relative to each other, and are spaced apart from each other such that a plurality of gaps are respectively formed between the plurality of hinge segments.

8. The hinge mechanism of any of claim 7, wherein, in the unfolded configuration of the hinge mechanism,
the first ball is positioned at a second end portion of the socket of the first hinge segment of the pair of adjacent hinge segments, and
the second ball is positioned at a second end portion of the socket of the second hinge segment of the pair of adjacent hinge segments.

9. The hinge mechanism of claim 1, further comprising:
a first bracket coupled to a hinge segment of the plurality of hinge segments positioned at a first end of the arrangement of the plurality of hinge segments; and
a second bracket coupled to a hinge segment of the plurality of hinge segments positioned at a second end of the arrangement of the plurality of hinge segments.

10. The hinge mechanism of claim 9, further comprising a sliding mechanism coupled to the first bracket, the sliding mechanism including a sliding member slidably coupled to the first bracket.

11. The hinge mechanism of claim 10, wherein the sliding mechanism includes a biasing module fixedly coupled to the sliding member such that the biasing module moves together with the sliding member.

12. The hinge mechanism of claim 11, wherein the biasing module includes:
a cover fixed to the sliding member;
at least one cavity defined between the cover, the sliding member and the first bracket; and
at least one elastic member positioned in the cavity, wherein the at least one elastic member exerts a biasing force that urges the sliding member away from the first bracket.

13. The hinge mechanism of claim 10, wherein the sliding member includes:
at least one coupling recess configured to slidably receive at least one arm of the of the first bracket so as to support and guide a relative sliding movement of the first bracket and the sliding member; and
at least one pin configured to be movably received in at least one slot formed in the first bracket so as to limit an amount of relative sliding movement of the first bracket and the sliding member.

14. The hinge mechanism of claim 10, further comprising a support member fixedly coupled to the second bracket, wherein the sliding mechanism is movable relative to the hinge mechanism, and the support member moves together with the hinge mechanism.

15. A hinge mechanism, comprising:
a plurality of hinge segments, arranged in a row, each hinge segment of the plurality of hinge segments including:
a first socket formed in a first side of the hinge segment; and
a second socket formed in a second side of the hinge segment; and
a joint assembly including a plurality of ball joints, each ball joint of the plurality of ball joints being configured to movably couple a pair of adjacent hinge segments of the plurality of hinge segments, such that the pair of adjacent hinge segments are movable relative to each other, each ball joint of the plurality of ball joints including:
a rod;
a first ball at a first end portion of the rod; and
a second ball at a second end portion of the rod,
wherein the first ball is movably received in the first socket formed in a first hinge segment of the pair of adjacent hinge segments, and the second ball is movably received in the second socket of the second hinge segment of the pair of adjacent hinge segments, so as to movably couple the pair of adjacent hinge segments, and
wherein the hinge mechanism is configured to be installed in a housing of a computing device, at a position corresponding to a bendable section of a foldable display of the computing device.

16. The hinge mechanism of claim 15,
wherein the first socket of each hinge segment of the plurality of hinge segments includes:
a first channel formed within the hinge segment;
a first slot formed in the first side of the hinge segment, at a position corresponding to the first channel; and
a first opening at a first end portion of the first socket, connected to the first channel; and
wherein the second socket of each hinge segment of the plurality of hinge segments includes:
a second channel formed within the hinge segment;
a second slot formed in the second side of the hinge segment, at a position corresponding to the second channel; and
a second opening at a first end portion of the second socket, connected to the second channel.

17. The hinge mechanism of claim 16, wherein
a diameter of the first ball is greater than a diameter of the rod,
a diameter of the second ball is greater than a diameter of the rod,
an interior dimension of the first channel is greater than the diameter of the first ball received therein such that the first ball is movable along a length of the first channel,
a dimension of the first slot is less than the interior dimension of the first channel, and less than the diameter of the first ball, so as to laterally retain the first ball received in the first channel formed in the first socket of the hinge segment,
an interior dimension of the second channel is greater than the diameter of the second ball received therein such that the second ball is movable along a length of the second channel,
a dimension of the second slot is less than the interior dimension of the second channel, and less than the diameter of the second ball, so as to laterally retain the second ball received in the second channel formed in the second socket of the hinge segment.

18. The hinge mechanism of claim 17 wherein
a dimension of the first opening is greater than the diameter of the first ball, such that the first ball is introduced into the first channel of the first socket through the first opening,
a dimension of the first slot at a position corresponding to the first opening is less than the diameter of the first ball, such that the first ball is laterally retained in the first channel defining the first socket,
a dimension of the second opening is greater than the diameter of the second ball, such that the second ball is introduced into the second channel of the second socket through the second opening, and
a dimension of the second slot at a position corresponding to the second opening is less than the diameter of the second ball, such that the second ball is laterally retained in the second channel defining the second socket.

19. The hinge mechanism of claim 16, wherein
the first ball is slidable within the first channel of the first socket, and the first ball is movable in three dimensions in the first socket, and
the second ball is slidable within the second channel of the second socket, and the second ball is movable in three dimensions in the second socket.

20. The hinge mechanism of claim 16, wherein, in a folded configuration of the hinge mechanism,
the first ball is positioned at the first end portion of the first socket of the first hinge segment of the pair of adjacent hinge segments, and
the second ball is positioned at the first end portion of the second socket of the second hinge segment of the pair of adjacent hinge segments.

21. The hinge mechanism of claim 15, wherein, in a folded configuration of the hinge mechanism, a plurality of hinge segments abut an adjacent hinge segment so as to define a contour corresponding to a bending radius of a foldable display coupled thereto.

22. The hinge mechanism of claim 15, wherein, in an unfolded configuration of the hinge mechanism, the plurality of hinge segments are movable relative to each other, and are spaced apart from each other such that a plurality of gaps are respectively formed between the plurality of hinge segments.

23. The hinge mechanism of claim 22, wherein, in the unfolded configuration of the hinge mechanism,
the first ball is positioned at a second end portion of the first socket of the first hinge segment of the pair of adjacent hinge segments, and
the second ball is positioned at a second end portion of the second socket of the second hinge segment of the pair of adjacent hinge segments.

24. The hinge mechanism of claim 15, further comprising:
a first bracket coupled to a hinge segment of the plurality of hinge segments positioned at a first end of the arrangement of the plurality of hinge segments; and
a second bracket coupled to a hinge segment of the plurality of hinge segments positioned at a second end of the arrangement of the plurality of hinge segments.

25. The hinge mechanism of claim 24, further comprising a sliding mechanism coupled to the first bracket, the sliding mechanism including a sliding member slidably coupled to the first bracket.

26. The hinge mechanism of claim 25, wherein the sliding mechanism includes a biasing module fixedly coupled to the sliding member such that the biasing module moves together with the sliding member.

27. The hinge mechanism of claim 26, wherein the biasing module includes:
a cover fixed to the sliding member;
at least one cavity defined between the cover, the sliding member and the first bracket; and
at least one elastic member positioned in the cavity, wherein the at least one elastic member exerts a biasing force that urges the sliding member away from the first bracket.

28. The hinge mechanism of claim 25, wherein the sliding member includes:
at least one coupling recess configured to slidably receive at least one arm of the of the first bracket so as to support and guide a relative sliding movement of the first bracket and the sliding member; and
at least one pin configured to be movably received in at least one slot formed in the first bracket so as to limit an amount of relative sliding movement of the first bracket and the sliding member.

29. The hinge mechanism of claim 25, further comprising a support member fixedly coupled to the second bracket, wherein the sliding mechanism is movable relative to the hinge mechanism, and the support member moves together with the hinge mechanism.

30. The hinge mechanism of claim 15, further comprising a framing member surrounding an outer periphery of the foldable display and opposite end portions of the hinge mechanism installed in the computing device, wherein the frame member is bendable so as to maintain an alignment of the hinge mechanism, the foldable display and the housing in a folded configuration and in an unfolded configuration of the computing device.

\* \* \* \* \*